United States Patent
Marshak et al.

(10) Patent No.: US 6,910,075 B2
(45) Date of Patent: Jun. 21, 2005

(54) DYNAMIC RDF GROUPS

(75) Inventors: Marik Marshak, Newton, MA (US); Mark J. Halstead, Watertown, MA (US); David Meiri, Cambridge, MA (US); Alexandr Veprinsky, Brookline, MA (US)

(73) Assignee: EMC Corporation, Hopkinton, MA (US)

(*) Notice: Subject to any disclaimer, the term of this patent is extended or adjusted under 35 U.S.C. 154(b) by 89 days.

(21) Appl. No.: 10/262,684

(22) Filed: Oct. 2, 2002

(65) Prior Publication Data

US 2003/0093597 A1 May 15, 2003

Related U.S. Application Data

(63) Continuation-in-part of application No. 09/997,810, filed on Nov. 30, 2001, now Pat. No. 6,862,632.
(60) Provisional application No. 60/332,991, filed on Nov. 14, 2001.

(51) Int. Cl.[7] ............................................. G06F 15/16
(52) U.S. Cl. ..................... 709/227; 709/201; 709/205; 709/216; 709/217; 709/219; 709/220; 709/243; 370/352; 370/398; 370/469; 707/201; 707/202; 710/1; 712/13; 714/6; 718/104
(58) Field of Search ................................ 709/221, 227, 709/238, 242

(56) References Cited

U.S. PATENT DOCUMENTS

| | | | |
|---|---|---|---|
| 5,206,939 A | | 4/1993 | Yanai et al. |
| 5,544,347 A | | 8/1996 | Yanai et al. |
| 5,719,942 A | * | 2/1998 | Aldred et al. ............... 709/228 |
| 5,742,792 A | | 4/1998 | Yanai et al. |
| 5,778,394 A | | 7/1998 | Galtzur et al. |
| 5,806,074 A | * | 9/1998 | Souder et al. ............... 707/201 |
| 5,845,147 A | | 12/1998 | Vishlitzky et al. |
| 5,857,208 A | | 1/1999 | Ofek |
| 6,047,323 A | * | 4/2000 | Krause ........................ 709/227 |
| 6,088,730 A | * | 7/2000 | Kato et al. ................... 709/227 |
| 6,144,999 A | * | 11/2000 | Khalidi et al. ............... 709/219 |
| 6,295,448 B1 | * | 9/2001 | Hayes et al. ................. 455/420 |
| 6,324,563 B1 | * | 11/2001 | Hotea et al. ................. 718/104 |
| 6,529,963 B1 | * | 3/2003 | Fredin et al. ................... 710/1 |
| 6,574,239 B1 | * | 6/2003 | Dowling et al. ............. 370/469 |
| 2001/0027491 A1 | * | 10/2001 | Terretta et al. .............. 709/238 |
| 2002/0071427 A1 | * | 6/2002 | Schneider et al. .......... 370/352 |

OTHER PUBLICATIONS

Pending U.S. Appl. No. 09/997,810, filed Nov. 30, 2001, entitled Dynamic RDF.
Pending U.S. Appl. No. 09/591,827, filed Jun. 12, 2002, entitled Multihop System Calls.

* cited by examiner

Primary Examiner—Hosain Alam
Assistant Examiner—Michael Y Won
(74) Attorney, Agent, or Firm—Choate, Hall & Stewart LLP

(57) ABSTRACT

Described are techniques used in dynamically modifying RDF groups. A system call is issued by a host computer system to execute a remote system call on a first data storage system to create, remove, or modify an RDF group between the first data storage system and another data storage system that is remotely connected to the first data storage system in an RDF switched environment. As part of executing the remote system call, data is pushed from the first to the second data storage systems without having an established link between the data storage systems. Each data storage system performs processing to make the necessary modifications in all directors in accordance with the dynamic RDF group. A status indicating success or failure of the remote system call is returned to the host computer system.

58 Claims, 17 Drawing Sheets

DYNAMIC RDF GROUPS

RELATED APPLICATIONS

This application is a continuation-in-part of U.S. patent application Ser. No. 09/997,810 filed on Nov. 30, 2001, now U.S. Pat. No. 6,862,632 entitled "DYNAMIC RDF", which claims priority to U.S. Provisional Patent Application No. 60/332,991 filed on Nov. 14, 2001, all of which are incorporated by reference herein.

BACKGROUND

1. Technical Field

This application generally relates to a computer system, and more particularly to techniques used computer system configuration.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations and also administrative tasks, such as data backup and mirroring operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. Data storage device communication between Symmetrix™ data storage systems using RDF is described, for example, in U.S. Pat. Nos. 5,742,792 and 5,544,347, both of which are incorporated by reference herein. With RDF, a user may denote a first storage device as a master storage device and a second storage device as a slave storage device. Other incarnations of RDF may provide a peer to peer relationship between the local and remote storage devices. The host interacts directly with the local storage device, but any data changes made to the local storage device are automatically provided to a remote storage device using RDF. The local and remote storage devices may be connected by a data link, such as an ESCON link or a Fiber Channel link. The RDF functionality may be facilitated with an RDF adapter (RA) provided at each of the storage devices.

In some instances, it may be desirable to modify the RDF configuration system. However, in many cases, such modifications require skilled technicians using special software and non-standard connections to the local storage devices. It may be desirable to automate the RDF configuration modification process to allow a host to modify the RDF configuration. In addition, it may be desirable that allowing dynamic modifications to RDF configuration will not effect operation of the storage device when individual devices therein need to access the dynamic configuration information.

SUMMARY OF THE INVENTION

In accordance with one aspect of the invention is a method for dynamically modifying a communication path between a first group of devices in a first data storage system and a second group of devices in a second data storage system. A command request is issued to the first data storage system to dynamically modify the communication path. Setup data is pushed from the first data storage system to a second data storage system using a communication link that is not ready to transmit user data. A first part of a connection to the first group of devices is prepared. After successfully preparing the first part, preparing a second part of the connection to the second group of devices. After successfully preparing the first and second parts of the connection, indicating that the communication path is ready to transmit user data.

In accordance with another aspect of the invention is a computer program product for dynamically modifying a communication path between a first group of devices in a first data storage system and a second group of devices in a second data storage system including: machine executable instructions for issuing a command request to said first data storage system to dynamically modify said communication path; machine executable instructions for pushing setup data from said first data storage system to a second data storage system using a communication link that is not ready to transmit user data; machine executable instructions for preparing a first part of a connection to said first group of devices; machine executable instructions for, after successfully preparing said first part, preparing a second part of said connection to said second group of devices; and machine executable instructions for, after successfully preparing said first and second parts of said connection, indicating that said communication path is ready to transmit user data.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT (S)

Figure 1:
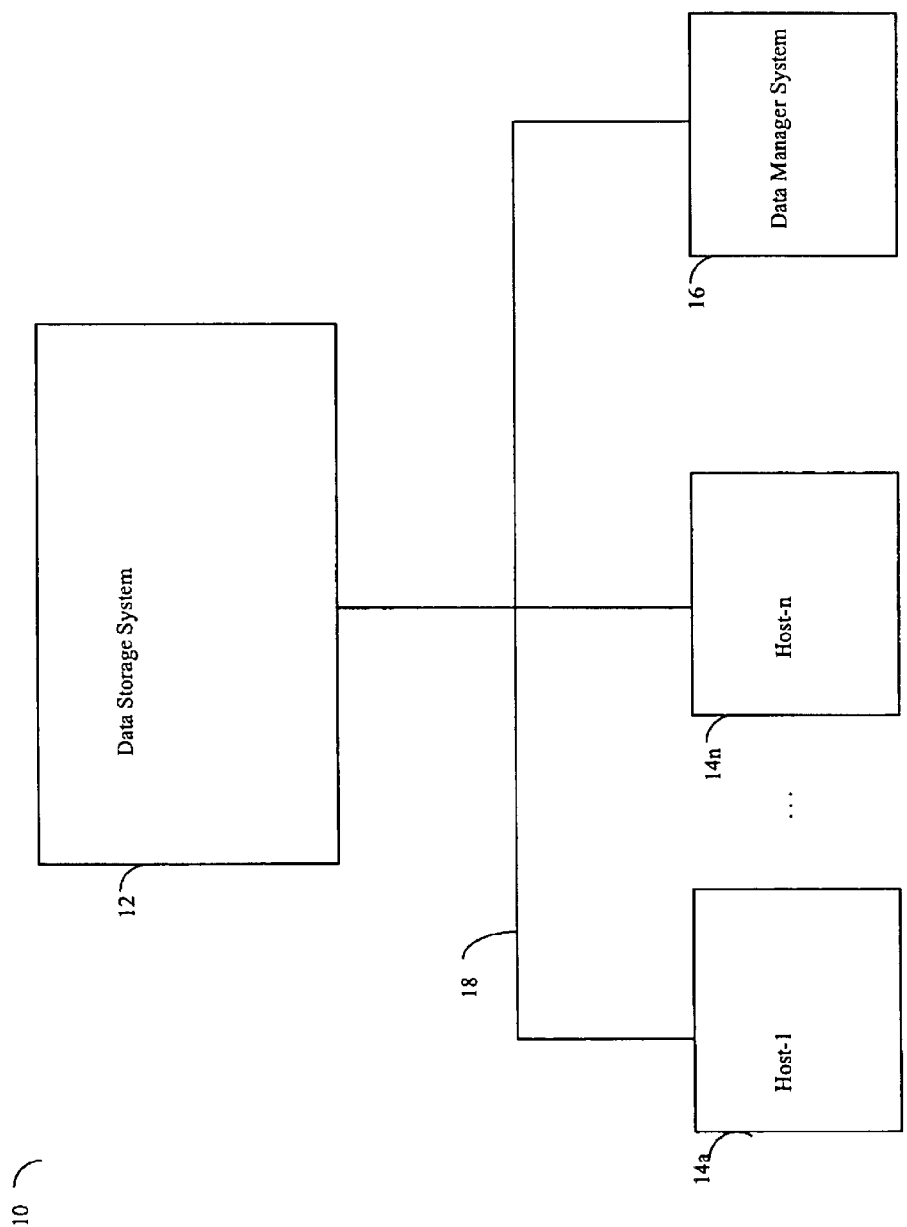
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue a data request to the data storage system 12 to perform a data operation. For example, an application executing on one of the host computers 14a–14n may perform a backup, mirroring or other administrative operation and may do so while performing data requests to the data storage system 12.

Figure 2:
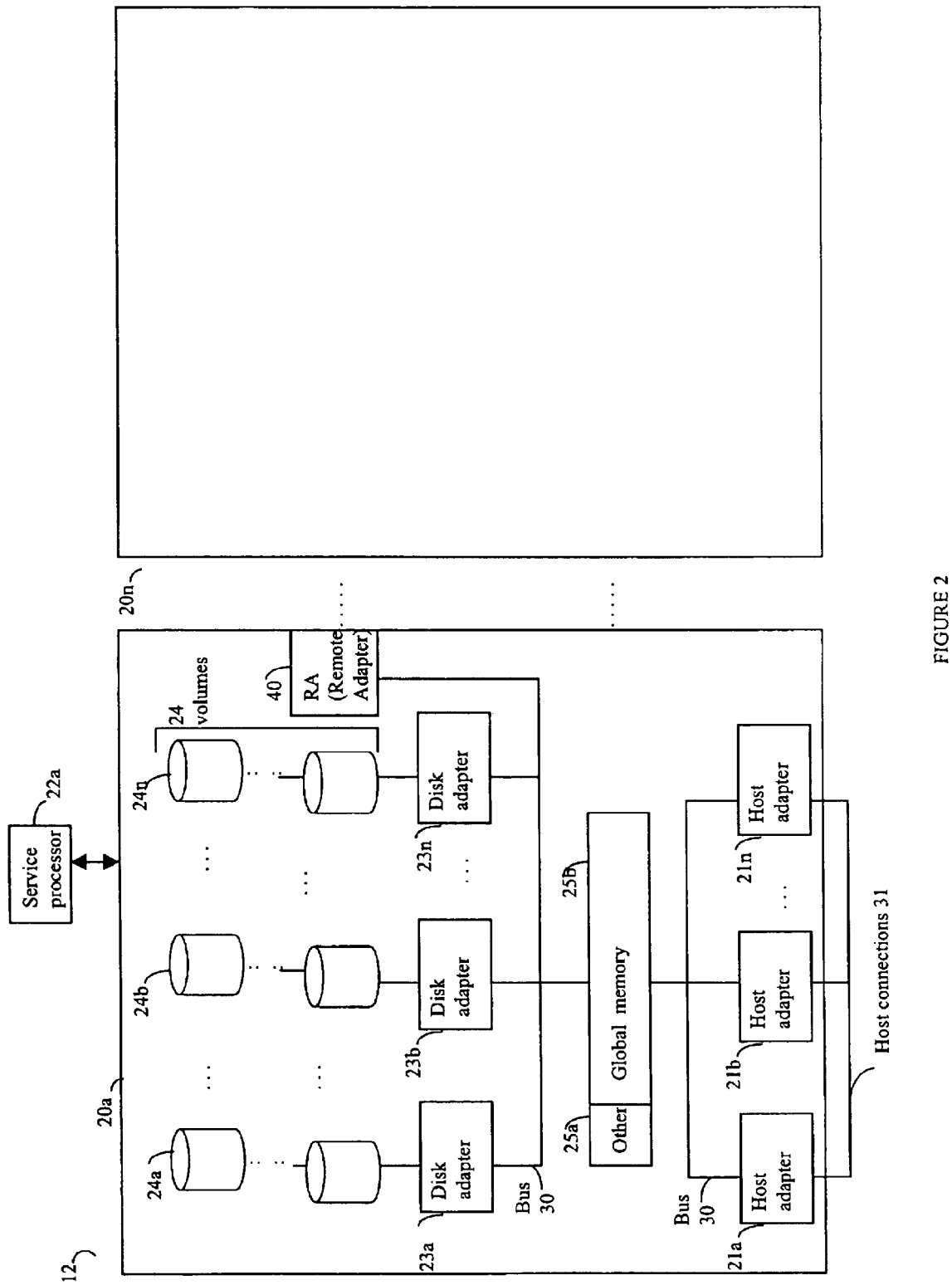
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a–20n as manufactured by EMC Corporation of Hopkinton, Mass. In this particular example, each of the Symmetrix™ storage systems 20a–20n may be interconnected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a–20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a–24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a–23n are connected, for example, by a bus 30 to a cache that includes a particular portion designated as global memory 25b. The DAs 23a–23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a–14n. This performance data may be gathered and stored, for example, in the global memory and/or other storage area.

The system 20a may also include one or more host adapters ("HAs") or directors 21a–21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations of multiple LVs that may reside on a disk. The DA may accomplish this by creating job records for the different LVs associated with the particular DA. These different job records may be associated with the different LVs in a data structure stored and managed by each DA.

Figure 3:
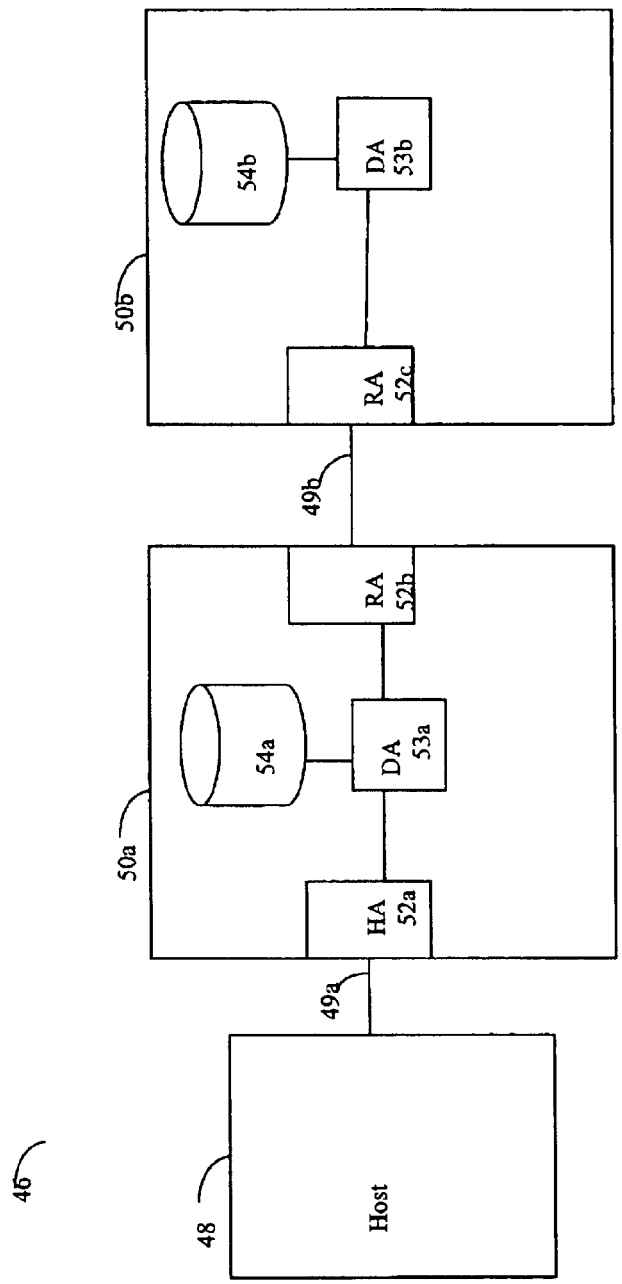
FIG. 3 is a simplified illustration of an example of an embodiment of the computer system of FIGS. 1 and 2.

Referring now to FIG. 3, shown is an example of an embodiment of a computer system 46 illustrating the relationship between a host 48, a first data storage system 50a and a second data storage system 50b. It should be noted that the embodiment illustrated in FIG. 3 is a simplified view of components of a computer system, for example, including only some detail in data storage systems 50a and 50b for the sake of simplicity. The host 48 may issue a command to data storage system 50a over connection 49a using the HA 52a. Communications between data storage systems 50a and 50b may be facilitated over connection 49b using RA 52b and RA 52c included in, respectively, data storage systems 50a and 50b. The link 49b may be an RDF link causing data from data storage system 50a to be copied to the remote data storage system 50b. Data from a device, such as 54a, may be copied to the storage device 54b in a remote data storage system 50b using the RDF link 49b causing the data on the remote storage device 54b to be identical to the data on the local storage device 54a.

Providing an RDF mapping between portions of devices included in data storage system 50a and devices included in data storage system 50b may be done by setting up LVs on the remote data storage system 50b that mirror those included in the data storage system 50a. The host 48 may read and write data using the logical device on data storage system 50a. An RDF mapping may cause the modified data to be transferred from data storage system 50a to a corresponding device identified via the RDF mapping on data storage system 50b. In a steady state of operation, logical devices on the remote data storage system 50b contain identical data to that which is included in the corresponding device via the RDF mapping and data storage system 50a. The logical device on the data storage system 50a accessed by the host may be referred to as the "R1" volume while the corresponding logical device on a remote data storage system such as 50b may be referred to as the "R2" volume. In operation, the host 48 may read and write data using an R1 volume in 50a, and RDF may handle the automatic copying and updating of data from the R1 volume to the R2 volume in 50b.

R1/R2 pairs may be defined in a variety of different ways. R1/R2 pairs may be defined in accordance with static configuration data in which a configuration data file may exist, for example, in global memory. This may be referred to as static information in that the data file is read at initialization of the data storage system such as 50a and remains in existence as an R1/R2 pair that can not be modified. Using a static configuration file, the only way to modify, including creating and destroying, R1/R2 pairs is to modify the static configuration file and initialize the data storage system again. Additionally, the configuration data file may need to be modified using special software and may also require the assistance of a technician familiar with the particular configuration data file.

In addition to static configuration data, a data storage system may include dynamic configuration data that may also be stored in a portion of global memory. In some embodiments, dynamic configuration data may override any information included in the static configuration data. In other embodiments, dynamic configuration data may only be additive such that, for example, it may only be used in instances in which there is no entry in the static configuration data file having a corresponding item. In addition to having a dynamic and a static configuration technique, an embodiment may also include the concept of an RDF group in which zero or more RDF devices on a data storage system are associated with a particular group under the control of a single RA which services the devices included therein. An embodiment may allow for the existence of an empty group including no devices. An RDF group may be defined statically, such as using a static configuration file, and also dynamically.

In some situations, it may be beneficial to allow the host 48 to create and destroy RDF volumes dynamically during operation of the system. Such techniques are described, for example, in U.S. patent application Ser. No. 09/997,810, filed Nov. 30, 2001, entitled "DYNAMIC RDF", which is incorporated herein by reference. Note that RDF volumes may be created and destroyed in pairs so that an R1/R2 pair may be destroyed or an R1/R2 pair may be created. Creating or destroying R1/R2 pairs may be initiated by the host 48. The host may send a multihop system command. The multihop system command is a single system command that is provided to multiple storage devices and indicates operations to be performed by the multiple storage devices. For example, the host 48 may send a multihop system command requesting that a particular R1/R2 pair be destroyed where the R1 volume is on data storage system 50a and the R2 volume is on the remote data storage system 50b by having each of the storage systems 50 and 50b locally modify a table that is used internally by each of the storage devices to govern setting up and managing RDF volumes. Creating an R1/R2 pair involves creating the R1 volume on one storage device and creating the R2 volume on another storage device.

An embodiment may also include a switched RDF environment in which a single RA may service multiple RDF groups. In a switched RDF environment, RAs are connected and communicate using a switch. Communication points on the switch may be dynamically modified as well as the links therebetween. This is in contrast, for example, to a point-to-point type of connection which may be characterized as static having defined endpoints and a link that are not modifiable. A switched RDF environment may utilize, for example, fiber switch and GigE connections.

Techniques are described in following paragraphs for dynamically creating, destroying and otherwise modifying RDF groups in a switched RDF environment in which RDF links may be dynamically added or removed using remote system calls. The following description also provides for the creation of an empty RDF group in which a group may have a name associated with it but not have any associated data storage devices. In connection with the following description for creating, destroying and otherwise modifying RDF groups, a pair of RDF groups is defined in which a first RDF group on a local data storage system has a corresponding RDF group on a remote data storage system. This is analogous to the R1/R2 pair except that each of the R1 and R2 refers to an RDF group.

Additionally, the techniques described herein do not require that a link be initialized and allocated between any two RDF groups. Rather, the techniques described herein require only that a physical link exist between the RDF groups.

The embodiment described in the following paragraph includes certain requirements or restrictions. The particular requirements and/or restrictions included in an embodiment may vary in accordance with the details of each particular embodiment. When using the system call, RDF groups are added or removed in pairs to both a local and a remote data storage system. Each system call is allowed to create or remove only one group in each data storage system. Only one instance of the system call to modify a dynamic RDF group is allowed to execute at any given time. As described above, the creation or removal of an RDF group pair does not assume that there is already a link established between the data storage systems of interest. The dynamic group information is stored in non-volatile memory in the event, for example, of a power failure. The system call for a dynamic RDF group is allowed to add or remove only a dynamic RDF group. Accordingly, for example, this command may not be allowed to change any proper use of groups included in the static configuration file. The dynamic RDF group system command affects the contents of the dynamic configuration file as described elsewhere herein. This command may not be used to update values included in the static configuration data file. An RDF group which is not empty may not be removed by using the dynamic RDF group system command.

A dynamic group lock may be used as a mechanism for insuring that only one single instance of this dynamic RDF group command executes at a single time. In this embodiment, the dynamic group lock may be characterized as a bit flag serving as a signal as to when one instance of the dynamic RDF group command is executing. This bit flag may be stored in global memory on each data storage system. This technique does not place a software or hardware lock guaranteeing exclusivity. Rather, this flag serves as a signaling technique which is observed by all processes. Other embodiments may use other techniques.

As described herein, a nonexistent group may use a global system queue or GST within the data storage system for communication with one or more other RDF groups. Existing dynamic groups may have static queues already defined in connection with initializing the system. Accordingly, in connection with communicating with RAs while managing RDF groups for the dynamic RDF group system command that will be described herein, the GST queue may be used as a means for communications between RAs within the same data storage system.

An embodiment may provide for the dynamic RDF group command using only a single call for adding and removing a dynamic group rather than define multiple calls. A modification to a dynamic system group includes adding or removing support for a group by some or all of the relevant directors or RAs. In connection with removing a dynamic RDF group, this particular embodiment causes a failure if the last director is removed and the group is not empty. When a group is removed, the associated link is also removed. In case this is the last link for the group, the group information is also be removed.

A special task may be used to transfer group information for creating and removing a group on a remote data storage system without having a link between a local and a remote data storage system. The two data storage systems have a physical link between them, for example, such as being connected through a switch. The general technique employed by the special task is to start a link discovery process for an unused link and terminate the link discovery process prior to completing initialization immediately after the remote data storage system receives the dynamic group information, and accordingly returns a status to the local data storage system. This link is once again made uninitialized. An unused link may refer to an existing physical connection which is currently not allocated or in use as a communication between two RAs or other types of user applications. The process of link initialization is started on a local data storage system and information regarding the dynamic group data as communicated by a remote system call is pushed to a remote data storage system. Once the information has been pushed to the remote data storage system and the local data storage system receives a status regarding this information as being received by the remote data storage system, the local data storage system indicates the link as uninitialized. This special task and its processing are described in more detail below.

Each director, RAs, DAs and HAs, all include information that may be stored locally related to an RDF group. Some of the variables relating to an RDF group may only be initialized in the static configuration file. It may be necessary to update group information as maintained by HAs, DAs and the like in addition to those RAs directly involved in the creation of the RDF group. If there is a change dynamically to the RDF group information, all directors including directors not directly involved in the addition or removal of a group may be accordingly notified.

In connection with ensuring that non-RDF directors such as HAs and DAs receive the updated information in connection with a dynamic RDF group change, several different mechanisms may be used in an embodiment. First as described in following paragraphs, the dynamic RDF group RA responsible for the change may send a GST queue request to inform other directors about the change in connection with RDF groups. However, as described below, the RA responsible does not verify that each of the directors actually performs this update in reading the new information from global memory. Added for execution on each director may be a low priority task instructing each of the directors to download from global memory the latest copy of the RDF group dynamic group table or DRGT and to build the required group masks in any data maintained locally on each director. It should be noted that if a low priority task finds out that a dynamic RDF group system call command is currently executing within a data storage system, such as by examining the global memory lock, the low priority task may wait until the lock is released prior to continuing execution.

What will now be described are some data structures used in processing steps described in more detail in following paragraphs to perform the dynamic RDF group modification command.

Figure 4:
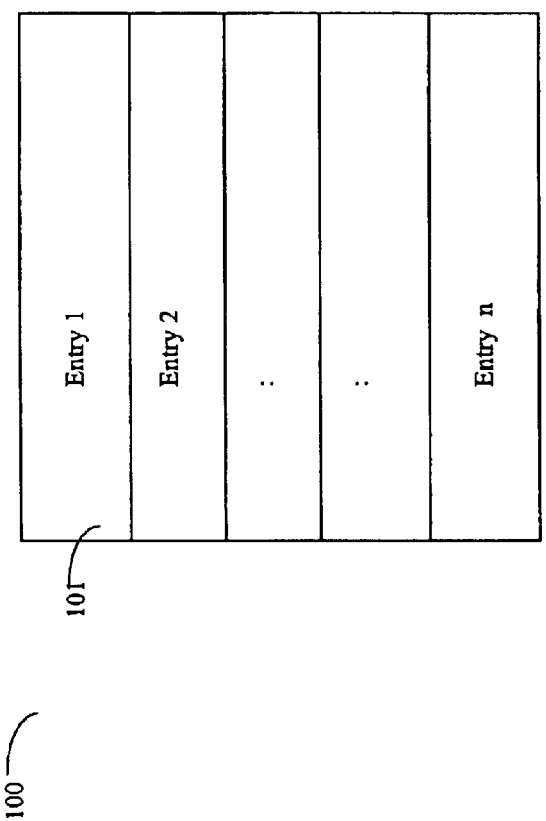
FIG. 4 is an example of an embodiment of a dynamic RDF group table (DRGT)

Referring now to FIG. 4, shown is an example of an embodiment of a Dynamic RDF Group Table (DRGT). Each director has a DRGT identifying information particular to the data storage system in which the director resides. The DRGT includes an entry for each possible RDF group. In one embodiment, the maximum number of possible RDF groups managed by a single director is sixty-four (64). Accordingly, the table in this embodiment includes sixty-four entries. The maximum number of RDF groups that may be managed in any particular embodiment may vary and is not limited to the particular number of sixty-four as described herein. Also described are other specific numbers and values used in the examples described herein. These specific values should not be construed as limitations upon the concepts, techniques and principles described herein but rather are factors that may vary in accordance with each embodiment.

Each director's local copy of the DRGT is stored in a portion of non-volatile memory. As described herein, a director may be, for example, an RA, DA or HA as described elsewhere herein. A copy of the DRGT table is also stored in global memory such as described elsewhere herein in connection with FIG. 2. It should be noted that the copy of the DRGT stored in global memory is considered to be the most up to date and correct copy of the DRGT table. In this embodiment, the copy of the DRGT table stored in each director's non-volatile memory portion is a complete copy of the table from global memory.

Figure 5:
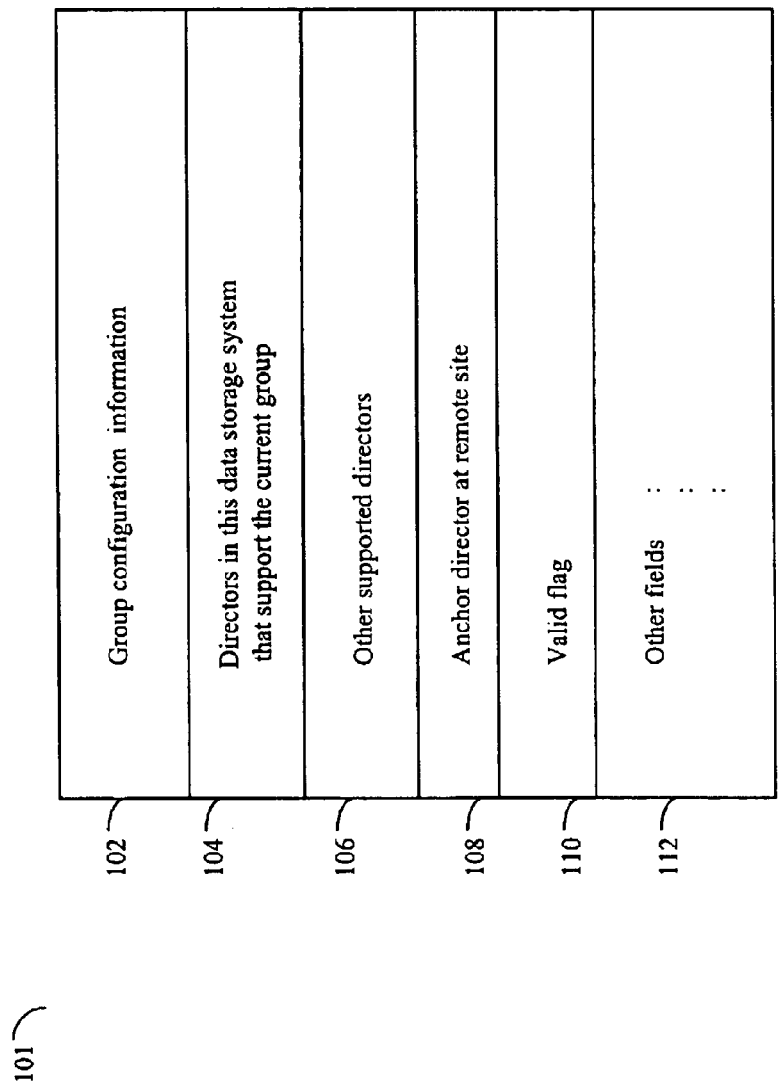
FIG. 5 is an example of an entry of the DRGT.

Referring now to FIG. 5, shown is a more detailed example of an embodiment of an entry of the DRGT table 100. In this particular embodiment, each entry in the DRGT of a data storage system includes information from the static configuration file, a bitmap of the directors in the data storage system that support the group corresponding to the entry, implementation specific information, and validity flags. In more detail, an entry 101 in this example includes group configuration information 102, a list of directors in this data storage system that support the current group 104, other supported directors 106, anchor director at the remote site 108, a valid flag 110, and any additional fields in this particular entry 112. The particular group configuration information included in the field 102 of the record entry 101 will be described in more detail in following paragraphs. It should be noted that the copy of the information included in the group configuration information entry 102 is the same as the group configuration information that may also be included in a static configuration file for other types of configuration information describing the group stored elsewhere in the system. In one embodiment, a copy of the static configuration file data may be stored in global memory on each data storage system. Each director within a data storage system may locally store a copy of all or portions of this static configuration data. The field 104 lists those directors in this data storage system that support the group currently being described by this record entry 101. The data storage system may be for example a symmetric data storage system that may include a plurality of directors such as RAs HAs and the like. The field 104 lists those directors in this particular data storage system that support the current group. The field 104 may be an encoded bitmap or other type of representation to identify the directors.

Fields 106 and 108 are used in connection with a particular embodiment using a GigE connection. Particular use of these fields is described elsewhere herein in more detail. The other supported directors field 106 includes a list such as a bitmap similar to field 104 identifying directors at a remote site. Field 108 is a particular director that may be referred to as the anchor director at the remote site with whom communications may be directed in connection with establishing a dynamic RDF group. In this particular embodiment, field 108 is used only for the GigE implementation. Similarly, other embodiments may require the use of other implementation specific fields than as described herein.

Field 110 includes a valid flag which may be implemented as a bit flag that contains a 1 indicating that the information included in the record or entry 101 is valid, and is 0 otherwise. Other fields 112 may also be included in each entry of the DRGT. These other fields may include, for example, additional information that may vary in accordance with each particular embodiment as well as padding characters that may be used in connection with performing any alignment requirements for a particular embodiment.

It should be noted that entries in local copies of the DRGT may be updated by directors in connection with processing steps described below.

Figure 6:
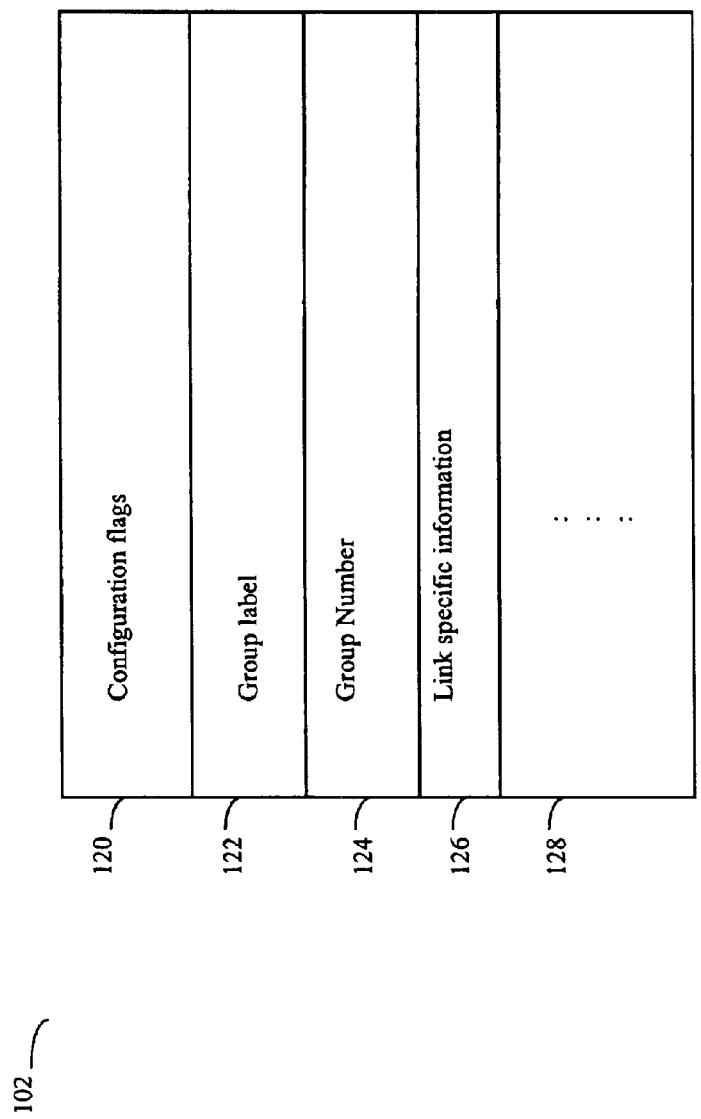
FIG. 6 is an example of configuration information included in the entry of FIG. 5.

Referring now to FIG. 6, shown is an example of more detailed information of the group configuration information described previously in connection with FIG. 5. In this particular embodiment, the group configuration information includes configuration flags 120, group label data 122, group number information 124, device link specific information 126 and any other information 128. The configuration flags 120 as well as the group label 122 and the group number 124 may function as common fields used in connection with different types of communication links. As described elsewhere herein, communication links are connections that may include, for example, fiber switch or GigE connections. The configuration flags 120 may include information for configuring the particular group. The group label and group number in, respectively, fields 122 and 124 include identifying information about an RDF group. In this particular example, an RDF group as noted by the group number in field 124 may have a 0 for example corresponding to a group A, a 1 corresponding to a group B and the like where each particular RDF group refers to the group of devices serviced by this particular RA director. The group label in this particular example may refer to a character string of up to ten characters. The group label is the same in both data storage systems involved in a connection. The group label may also be characterized as a nickname for the serial numbers and group numbers of the data storage systems in the connection.

Figure 7:
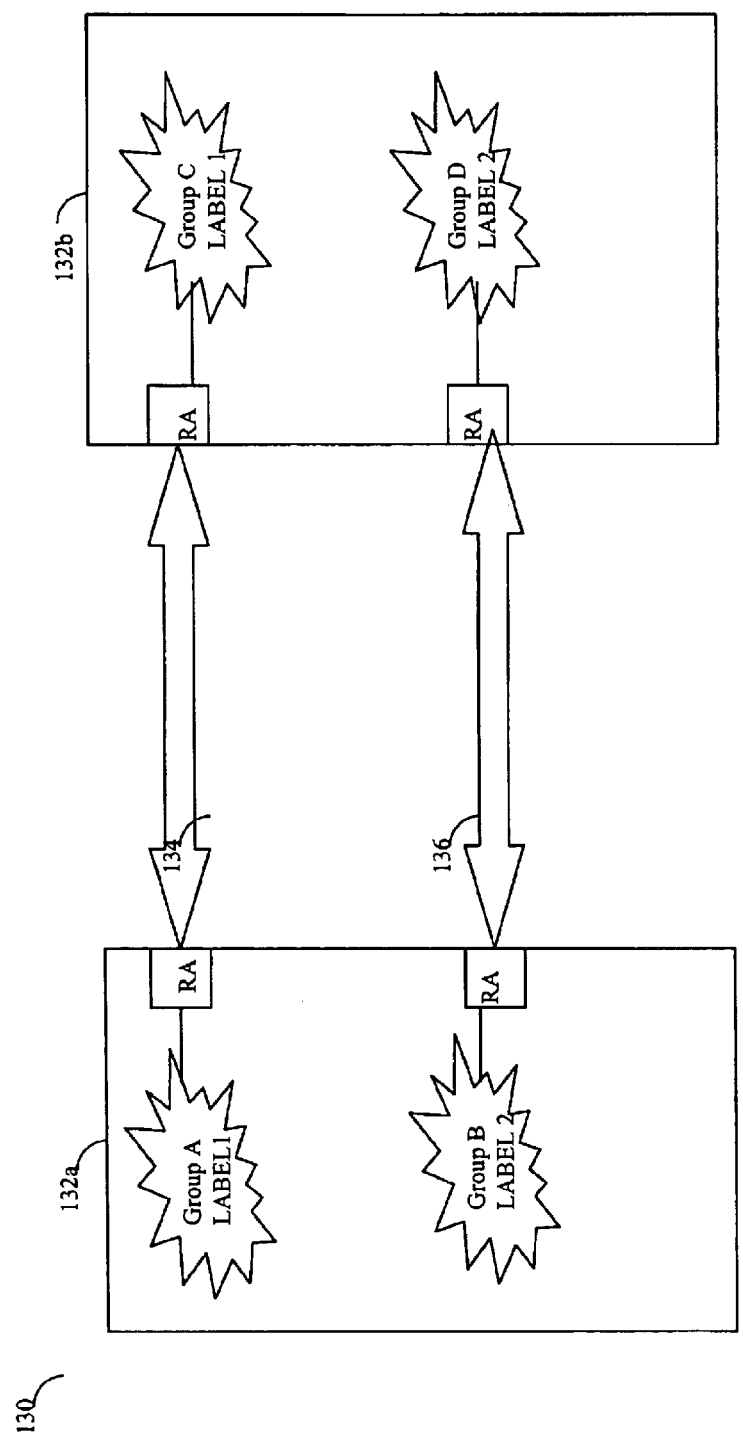
FIG. 7 is an example of an illustration of RDF groups.

Referring now to FIG. 7, shown is an example of embodiment 130 of two data storage systems 132*a* and 132*b*. Two RDF groups are defined in this example. The first group is defined as LABEL1 between RDF groups A and C having connection 134. A second RDF group defined as LABEL2 is associated with connection 136 between RDF groups B and D. Group A and group B are in data storage system 132*a* and group C and group D are included in data storage system 132*b*. An RDF group may be characterized as a bundle of zero or more RDF devices which is assigned a particular RA director that services the group.

An embodiment may include different restrictions in connection with defining and implementing groups. An embodiment may also include different restrictions and naming conventions for device labels. For example, a default label name may be used if no particular name is specified. An embodiment may include the restriction, for example, that a group using the default label name may not be an empty group. Other embodiments may have different restrictions in connection with naming and other types of specifications that may vary with each particular embodiment. In this particular example, the default RDF group label name may not be used in connection with empty groups as may be associated with initializing a new dynamic RDF group. An empty group may be characterized as not including any devices.

Referring back to FIG. 6, the group label 122, such as "LABEL1" or "LABEL2", may be associated with a pair of RDF groups as in FIG. 7 in which each RDF group is included in a different data storage system. Similarly, the group number 124 may be an encoding to represent each particular group such as A, B, C and D described in connection with FIG. 7. Field 126 may include different types of link specific information that vary with the communication connection used. For example, in connection with FIG. 7, the link or communication connection 134 between RDF groups A and C in different data storage systems may be a fiber switch link. Using a fiber switch link, a serial number may be used to obtain an address of a director. As also described in more detail elsewhere herein, other types of information may be used for different types of connections and links to obtain addresses of RAs servicing different RDF groups. The types of connections and techniques used to obtain RA address information may vary with each particular embodiment.

An embodiment may support any one or more types of communication connections between remote directors of different data storage systems, such as fiber switch and GigE connections. The different types of communication connections may utilize different techniques in obtaining a remote address of an RA or other director. Information included in the link specific information 126, for example, may be used in the process of determining such addresses. For fiber switch connections, a world wide naming service (WWN) may be used to obtain an address of a director given a serial number. For other types of connections, such as GigE, other techniques may be used since, for example, naming services such as WWN may not be available.

What will now be described is one technique that may be used in connection with obtaining director addresses in an embodiment supporting GigE connections.

Figure 8:
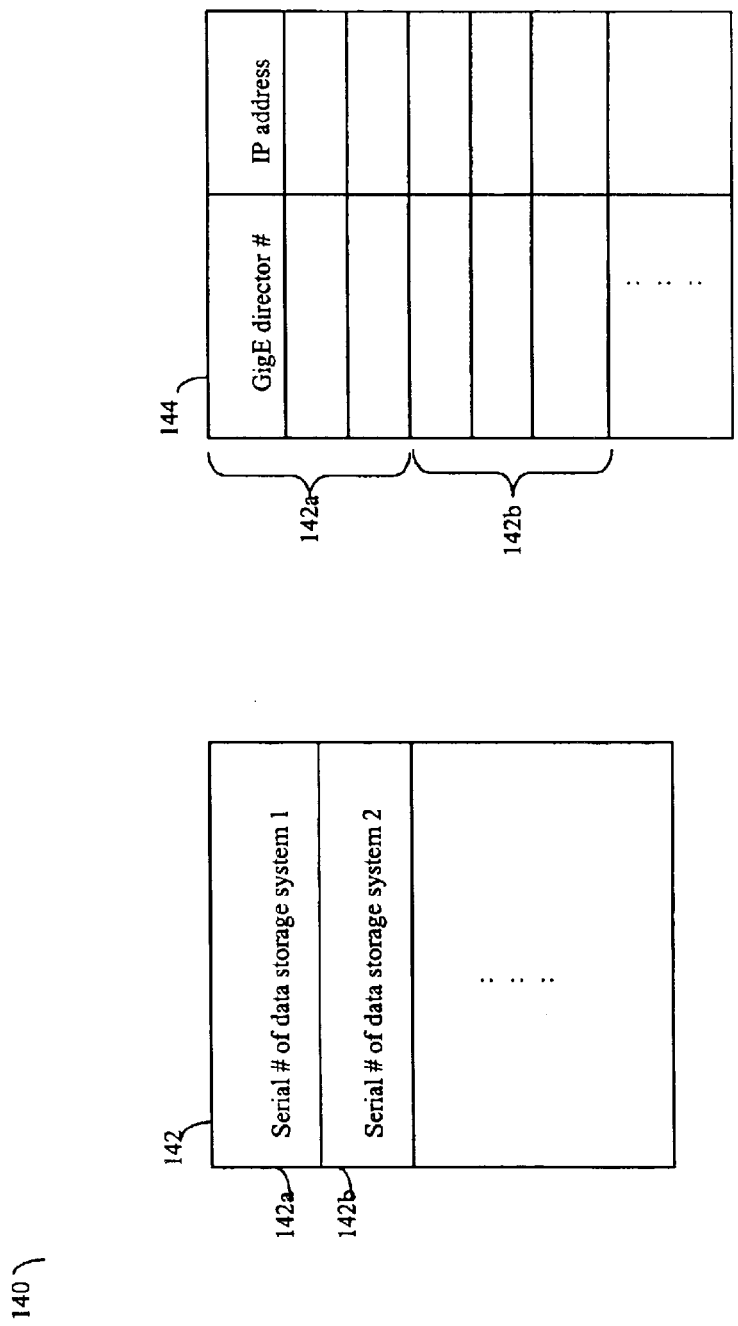
FIGS. 8 and 9 are examples of data structures used in connection processing an RDF dynamic group request operation for a GigE embodiment.

Referring now to FIG. 8, shown is an example of an embodiment 140 of tables that may be used with a GigE connection for facilitating communication between directors in remote data storages systems, such as Symmetrix data storage systems. In connection with a fiber switch connection, a naming service may be used to obtain the address of the target director given its serial number. In connection with a GigE connection, alternative techniques may be used to determine the particular address of directors. The tables 142 and 144 included in FIG. 8 140 may be used in connection with determining the IP address of a director. Instances of table 142 and 144 may be defined and stored in each data storage system, for example, in global memory or other portion of memory where configuration information may be stored. These tables may be stored in non-volatile memory.

Table 142 may be referred to as a Remote Box Table that includes an entry with the serial number of all other data storage systems included in a customer's environment. Table 142 may include an entry with a serial number for every other data storage system to which, for example, the current data storage system is able to remotely connect.

Each data storage system may also store in its global memory, for example, an instance of the Table 144. Table 144 may include information on all of the GigE director numbers and associated IP addresses. Table 144 may be organized such that all of the GigE director numbers and associated IP addresses for each data storage system are grouped together. The serial number obtained from Table 142 may be used as index into Table 144 to obtain addresses of one or more GigE directors located within a particular data storage system. By using the particular serial number of the data storage system paired with a particular GigE director number, the corresponding IP address may be obtained and used in connection with establishing a connection. In this embodiment, the particular director in a GigE embodiment to whom communications are directed may be specified as an input parameter in the dynamic RDF group system call.

It should be noted that an embodiment may include system calls or define an application programming interface (API) in order to provide information regarding the particular IP address of a GigE or other director. In other words, instead of directly accessing the values in the Tables 140 as described herein, a software facility included within a data storage system may provide an API, for example, with the input parameters of a serial number and a director number and return as an output parameter a particular address, such as a network address. This may be used as an alternative to the WWN service as may be used for example in connection with the fiber channel embodiment described also herein.

Figure 9:
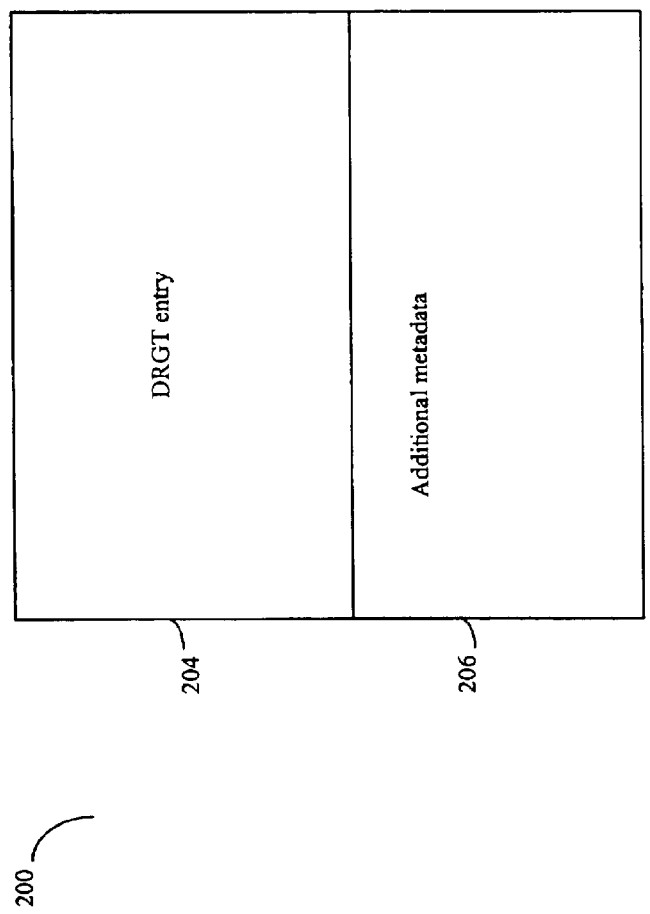

Referring now to FIG. 9, shown is an example of an embodiment 200 of an entry of the DRGT as may be included in global memory of a particular data storage. This structure is created and used when a temporary structure is created in processing, such as for steps 390 and 562 described elsewhere herein. It should be noted that an entry in the DRGT stored in global memory is a super set of information of an entry of the DRGT as may be stored locally by each director. The Global Memory (GM) temporary Structure 200 corresponding to a particular entry in the global memory version of the DRGT includes the DRGT entry 204 as described elsewhere herein in connection with element 101 of FIG. 5. Additionally, each entry in the global memory version of the DRGT includes additional metadata 206.

The additional metadata 206 may include the RDF group number. This group number may be used by a director to ensure that the correct entry in the static configuration file has been obtained for a particular group. The director creating the GM temporary structure 200 is passed a particular group number in the system call and places this in the additional metadata field 206. The director then copies other data from the global memory table DRGT entry and verifies that the group number of the DRGT matches that group number specified in the parameter. The group number in area 206 as described herein may be used for protection and data verification in processing steps, for example, to verify that the group number of a call parameter in the temporary structure as created by a first director matches the group number as received and used by another director in subsequent processing. It should be noted that other embodiments may include additional information in the global memory temporary structure in addition to that as described here. This may vary in accordance with each particular embodiment.

Figure 10:
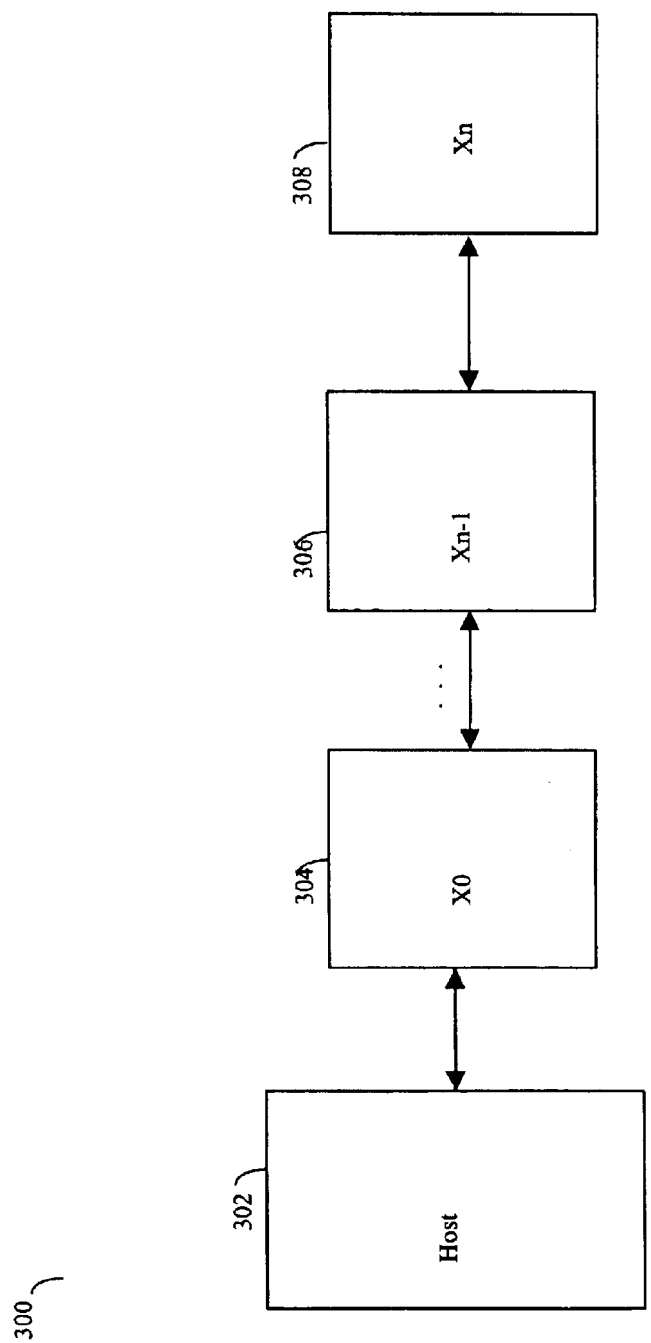
FIG. 10 is an example of an illustration of a multihop system call issued in a computer system for the RDF dynamic group request operation.

Referring now to FIG. 10, shown is an example of an embodiment of components of a computer system 300 that may be used in connection with creating and modifying a dynamic RDF group. As described elsewhere herein, an RDF group may be characterized as zero or more RDF devices. Generally, a particular RA as described in connection with FIG. 2 services a particular set of one or more groups. Although there may be other embodiments and configurations used in connection with defining and modifying a dynamic RDF group, described in following paragraphs and figures is an example in which remote system calls are used. For example, referring to the embodiment of configuration 300, the host 302 is connected to data storage device X0 304. The host 302 may use remote procedure calls in connection with creating a dynamic RDF group pair between data storage system Xn−1 306 and data storage system Xn 308. There may be zero or more other data storage systems intervening between data storage system 304 and 306. Although the techniques described herein are used in connection with remote system calls where a host is not directly connected to the device 306, the techniques used herein may also be used in connection with procedure calls used to establish a dynamic RDF group where there is also a direct connection between the host 302 and the data storage system such as 306.

In connection with the host 302 creating an RDF group pair between data storage system 306 and 308, the multihop procedure call as described in U.S. patent application Ser. No. 09/591,827, filed on Jun. 12, 2000, entitled "MULTI-HOP SYSTEM CALLS", which is incorporated herein by reference, may be used. Using a multihop system call, the host 302 may use remote procedure calls to establish an RDF dynamic group between data storage system 306 and 308 through an indirect connection to data storage system 306. In this instance, using the multihop system call, there are links in place between data storage system 304 and data storage system 306. The bit map included in the multihop system call indicates that only data storage system Xn−1 306 executes the remote system call. Additionally, included as a parameter in the multihop system call is an identifier of the remote director on data storage system 306 Xn−1 that is designated to execute the multihop system call. It should be noted that although a multihop system call may be used as described herein, remote system calls may be used in connection with dynamic RDF group commands. An embodiment using remote system calls, for example, may include host 302 directly issuing a remote procedure call to data storage system 306 rather than issue the system call through intermediate data storage systems indirectly connecting host 302 to 306.

Within data storage system 306, as well as other data storage systems included in the embodiment 300, there may be more than one RA. The multihop system call is forwarded from the host 302 through one or more intervening data storage systems until data storage system 306 is reached. A director RA specified by parameters of the multihop system call on data storage system 306 receives and executes the remote system call. The data storage system 306 waits for the remote system call to complete execution. Subsequently, after the remote system call finishes execution creating and/or modifying the dynamic RDF groups, the status of execution of this remote system call between systems 306 and 308 is returned back up the chain to the multihop system call to the host 302.

Figure 11:
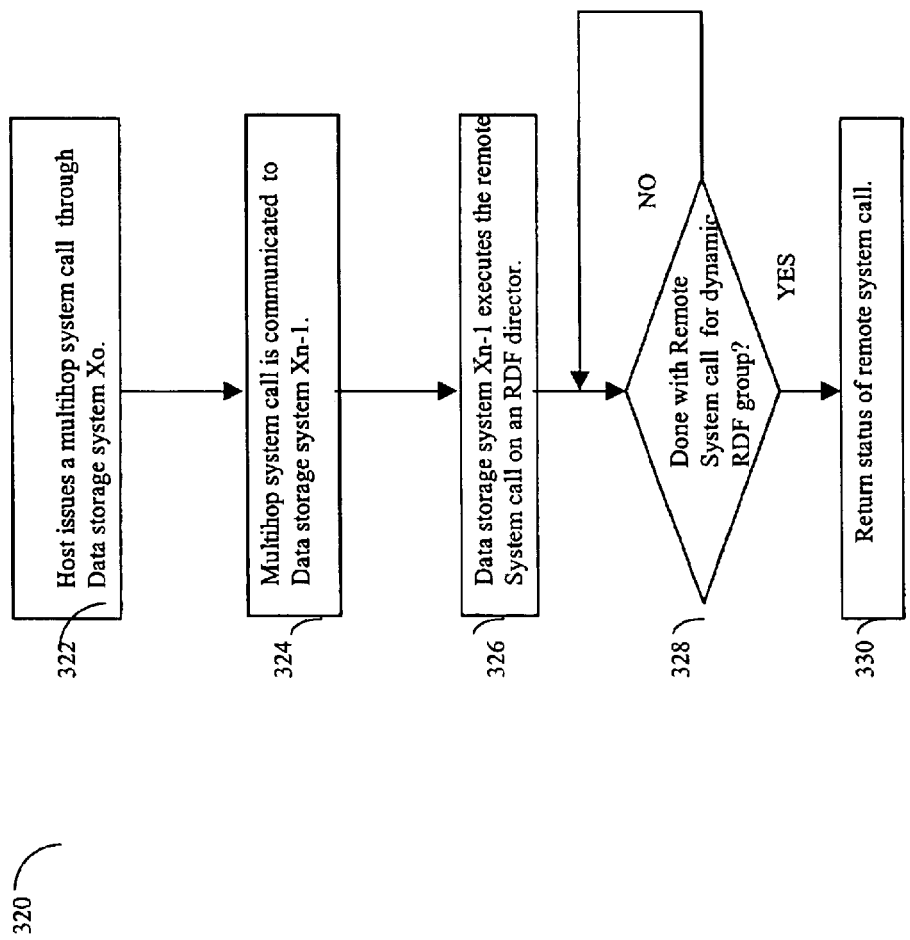
FIGS. 11, and 13–17 are flowcharts of steps of an embodiment for processing the RDF dynamic group request operation.

Referring now to FIG. 11, shown is the flowchart 320 summarizing processing steps described previously in connection with FIG. 10. At step 322, the host issues a multihop system call through data storage system X0. As described in connection with the embodiment 300, the host is directly connected to data storage system X0 and desires to execute a dynamic RDF group modification command remotely on another data storage system not directly connected to the host. At step 324, the multihop system call is communicated to data storage system Xn−1. It should be noted that in connection with processing of step 324, the multihop system call may be communicated through one ore more intermediate data storage systems as well. At step 326, data storage system Xn−1 executes a remote system call directed to an RA located on data storage system Xn−1. At step 328, a determination is made as to whether the remote system call for the dynamic RDF group is complete. If not, control proceeds back up to wait in a loop formed at step 328. When the remote system call for the dynamic RDF group has been completed, control proceeds to step 330 where a status of the remote system call in connection with the dynamic RDF group operation is returned through the series of one or more intermediate nodes back to the host computer system that issued the remote system call command.

Figure 12:
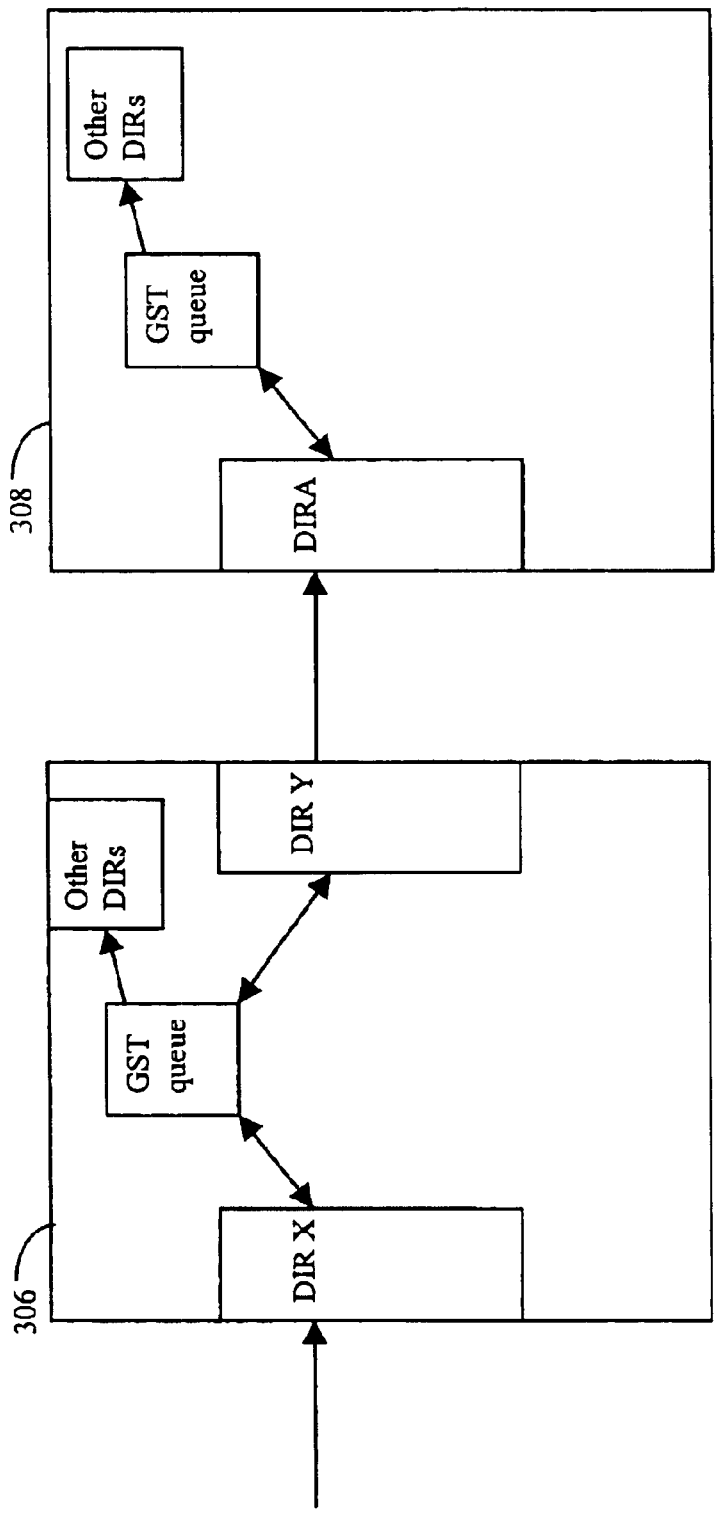
FIG. 12 is a more detailed illustration of two data storage systems included in the computer system of FIG. 10 processing the RDF dynamic group request operation.

Referring now to FIG. 12, shown is an example of an embodiment illustrating in more detail the processing steps of the data storage systems Xn−1 and Xn. Data storage system Xn−1 receives and executes the remote system call to modify or create a dynamic RDF group between data storage system Xn−1 306 and data storage system Xn 308. Included in the data storage system 306 are two directors noted as Director X and Director Y. Director X initially receives the remote system call for the dynamics RDF group operation. The Director X determines that it is actually a remote system call to be executed by another director. Subsequently, Director X creates a record in a queue called the global system (GST) queue in order to communicate information to another director which in this instance is Director Y. The queue record is a request for a remote system call to be executed in connection with the creation of the dynamic RDF group. The execution mask indicates the target director as Director Y specified in the parameters of the remote system call. Director X then goes into a wait state. The Director X may time out or return an error status or other type of completion status upon receiving return status information from Director Y regarding the operation. The execution mask indicates that Director Y is the designated recipient of the GST record created and placed in the GST queue. Director Y then contacts another director in the data storage system Xn 308 to transmit data from the system call. As described in more detail in following paragraphs, both Directors A and Y may also use their respective GSTs to communicate with other directors as needed in performed processing steps for the dynamic RDF group command and associated status information.

Director Y receives the GST queue record and performs a verification or check prior to attempting to execute the remote system call for the creation of the dynamic RDF group. In this embodiment, for example, Director Y may verify the following: that this particular RDF group is not already defined as a static RDF group for any director, that the group is not already defined for a director for which a requested group is being added, that the directors that need to create this group only of the specified types allowed in this particular embodiment, for example a fiber switch or a GigE connection. Additionally, the Y director may also perform any checks in connection with the group label and restrictions in connection with this embodiment, such as the group label is not a default group label since this operation may involve empty groups and the default group label may not be specified in this embodiment for empty groups. The Director Y may also check the serial number of Xn=1 data storage system 306 to see if it's serial number matches the serial number specified in the physical parameters of the system call. Director Y may also perform other checks in connection with restriction in a particular embodiment, such that no other instance the dynamic RDF group modification command is executing in this particular data storage system. In this embodiment, the Director Y will fail to execute the system call if the dynamic RDF group command is a command to remove the last director supporting a group and the group is not empty. It should be noted that the particular items verified initially by the Director Y may vary in accordance with each particular embodiment. Other embodiments may provide for performing other verifications in accordance with specifics of each embodiment.

Subsequent to successfully verifying the set of initial checks, Director Y marks the dynamic group lock in global memory locking the particular DRGT entries for this operation. Director Y then updates its own local copy of the DRGT stored in non-volatile memory using the copy included in global memory and then adding to its local copy the requested RDF dynamic group modification operation. As described elsewhere herein, the copy in global memory is deemed to be the most up-to-date copy in the system. Director Y also modifies appropriate group bits to prevent the link discovery process from starting prior to data storage system Xn being initialized with the appropriate group information.

Director Y creates a temporary global memory structure to store information regarding the dynamic RDF group operation. It should be noted that the global memory DRGT is not yet updated. The information for the dynamic group modification is placed in the temporary global memory copy by Director Y using information included in the system call parameters and also from other locations.

The following data may be included as input parameters in the multihop system call: the serial numbers of data storage systems Xn and Xn−1, the group label, a group number on Xn and another group number on Xn−1 defining this RDF group, a bit mask of directors on Xn−1 that support the group being modified (our_supported_dir), and a bit mask of directors on Xn that support the group being modified (other_supported_dir). Additionally, in a GigE embodiment, the data may include a particular director number on Xn to whom a director on Xn−1 communicates (gige_other_side_dir_anchor). Other embodiments may communicate different portions of the data using other techniques. Other embodiments may also include additional data in the than as described herein.

The multihop system call indicates director Y as the recipient director to execute this remote system call. Director Y may create the entry in the DRGT corresponding to this request for the dynamic RDF group command using data communicated in the system call parameters as described above, and also by copying information from global memory, such as the static configuration file data.

Director Y then executes steps in connection with notifying other RAs regarding the dynamic RDF group modification. Director Y may perform this operation by creating another record and placing it in the GST queue. The record is directed to all RAs which need to create this new dynamic group. The other RAs that need to create this group receive the GST record and verify that the record was issued by the same director, director Y, that actually locked the dynamic group lock on the DRGT stored in global memory. If each of the other RAs successfully verifies this condition or conditions, then each of the RAs accordingly updates a local copy of the DRGT stored in non-volatile memory using the system call parameter information residing in the temporary global memory structure.

If, however, the RA verification test fails, the RA detecting the verification failure does nothing and returns a failure message to Director Y. Director Y waits until all of the RAs have been notified and return a confirmation to Director Y regarding successful completion of the verification test. In the instance where any of the directors or RAs returns a failure to Director Y, the creation of the RDF dynamic group operation may be "undone". This operation may be "undone", for example, by not updating the DRGT in global memory with the information stored in the temporary global memory structure. Additionally, Director Y may issue to each of the RAs a message, such as using the GST queue, to update local DRGT copies using data from the DRGT table in global memory.

Assuming all RAs have successfully updated their own copies of the RDF information in connection with the dynamic group request, Director Y moves out of the wait state and creates a special task to perform the dynamic RDF group modification request in accordance with the remote system call.

Figure 13:
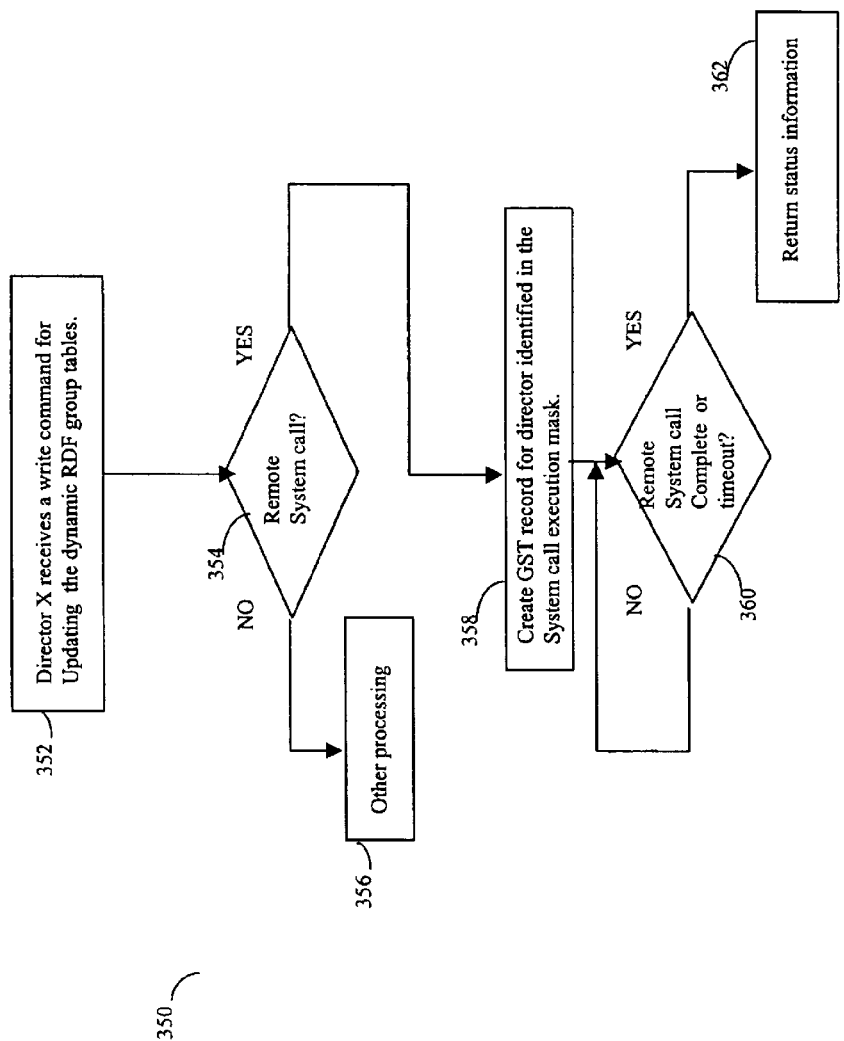

Before describing processing in connection with creating or removing a dynamic group on a remote box, two flowcharts in FIGS. 13 and 14 will now be described in connection with summarizing the processing just described as may be performed by data storage system Xn−1. Referring now to FIG. 13, shown is a flowchart 350 of steps of one embodiment as may be performed by Director X in connection with processing a dynamic RDF group modification command. At step 352, Director X receives a command for updating the dynamic RDF group table. This update may be, for example, in connection with adding or deleting a new RDF group as well as modifying an existing group. Control proceeds to step 354 where Director X makes a determination as to whether the right command received is a remote system call. If it is not a remote system call, control proceeds to step 356 where Director X performs other processing. Otherwise, control proceeds to step 358 where Director X creates a GST record using a queue for communicating to other directors within the data storage system Xn-1 306. The GST record created identifies or is directed to the director identified in the system call execution mask In this particular embodiment, the GST record and queue of the communication technique used for issuing commands between directors as well as communicating information and data there between. Other embodiments may use other techniques in connection with communications between and within data storage systems.

Control proceeds to step 366 where a determination is made by Director X as to whether the remote system call completes or times out. The Director X remains in a wait state until one or the other occurs. Accordingly, control proceeds to step 362 after either a completion status is returned indicating success or failure or a time-out has occurred. At step 362 status information may be returned to the other directors included in the call chain as well as the host computer system initially issuing the call. It should be noted that in connection with performing the wait operation in step 366 as well as other processing steps herein, a director may not remain in an idle state while waiting. An embodiment may use other techniques such as, for example, creating a wait task signaled when a completion status is returned for a particular job using an interrupt mechanism. Other embodiments may use other techniques in connection with performing the wait operations and processing steps in connection with step 366 and other described herein.

Figure 14:
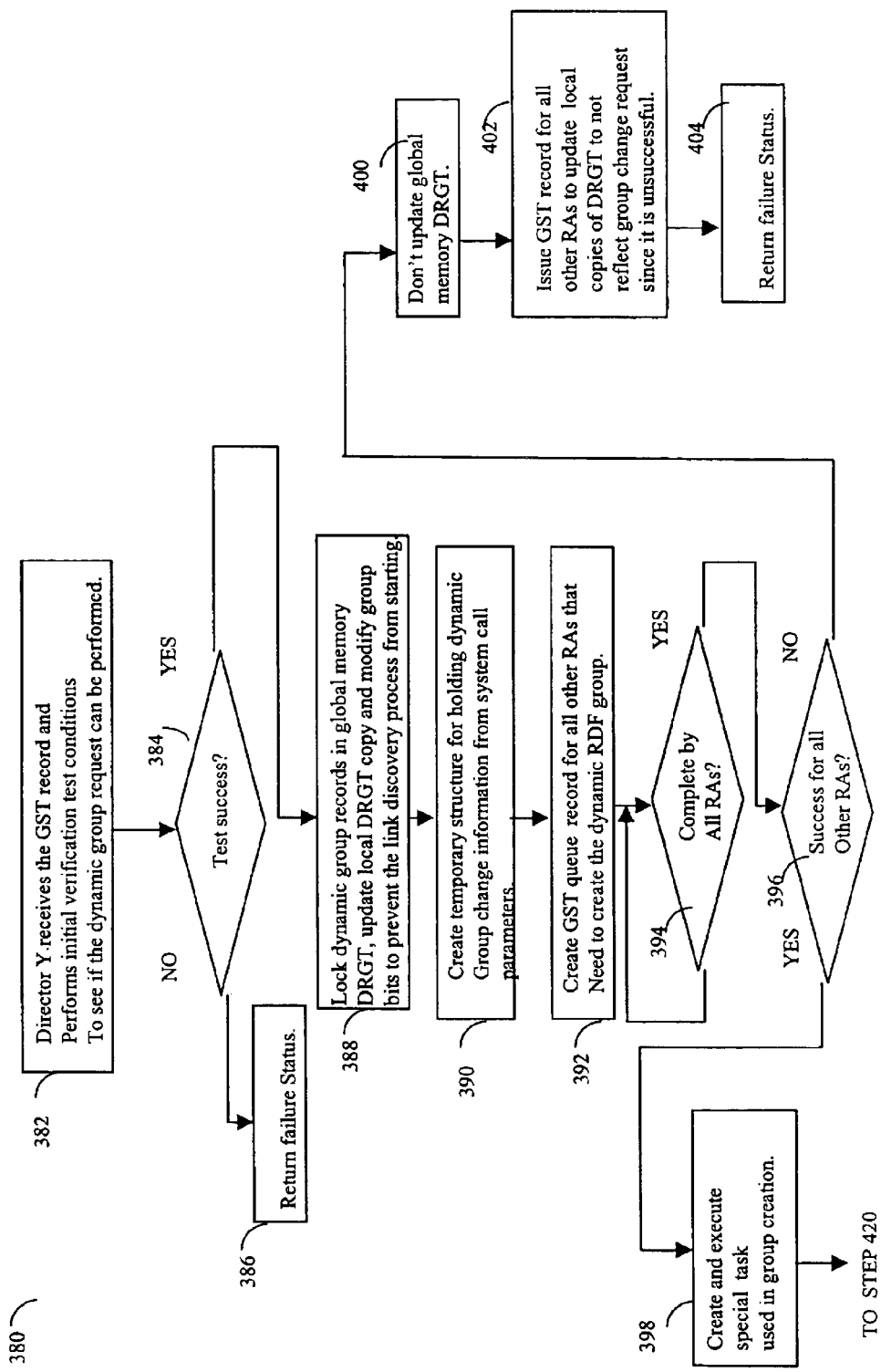

Referring now to FIG. 14, shown is a flowchart 380 of steps of an embodiment that may be performed by a second director, Director Y, included in the data storage system 306 Xn-1 in connection with a dynamic RDF group operation. At step 382, Director Y receives the GST queue record sent by Director X. Director Y then verifies test conditions to see if the dynamic RDF group operation may be performed. In step 384, a determination is made as to whether the test conditions were successful. If not, control proceeds to step 386 where a failure status may be returned. Otherwise, control proceeds to step 388 where Director Y locks the dynamic group record or records within global memory of the DRGT corresponding to the particular dynamic group request change, updates its local DRGT to reflect the modified group operation and modifies group bits to prevent the link discovery process from starting before data storage system Xn is set up with the correct group information. Control proceeds to step 390 where Director Y creates a temporary global memory structure for holding the dynamic group information request as obtained from the system call parameters. The temporary structure is initialized with this information accordingly.

Control proceeds to step 392 where a GST queue record is created to notify all other RAs that need to create the dynamic RDF group in connection with this operation. In other words, processing in step 392 is a message to all of the other RA to accordingly update their copies of the DRGT to reflect the requested change. Additionally, as described elsewhere herein, each of the RAs notified in connection with step 392 may also perform other test verification steps such as, for example, the director that issued the GST queue request in step 392 is the same director that locked the DRGT in global memory. Additionally, each of the RAs receiving the GST queue record created in step 392 updates its copy of the DRGT stored in its local memory. As part of this updating process, the DRGT from global memory is initially copied and accordingly updated with the dynamic group information for the current dynamic RDF group request using the temporary global memory structure. Each of the RAs sends a message back to Director Y indicating completion. Until Director Y has received a return status from all of the other RAs, or alternatively timed-out while waiting for such return status, Director Y proceeds waiting at step 394. When a completion status or time-out has been received in connection with all RAs, control proceeds to step 396 where a determination is made as to whether there has been a successful completion of this GST queue record request by all of the other RAs. If so, control proceeds to step 398 where a special task is created and executed in connection with transferring the new RDF group request information to another director in data storage system Xn. Otherwise, if there has not been a successful completion or update of the DRGT included locally in each of the RAs, control proceeds to step 400 where processing steps are taken in connection with "undoing" the operation with respect to the local copy of the DRGT stored on each of the RAs. At step 400, the global memory copy of the DRGT is not updated. At step 402, a GST queue record is created and issued to all of the other RAs to update their local copies of the DRGT using the unmodified global memory copy of the DRGT. At step 404, Director Y returns a failure status.

What will now be described are processing steps that may be taken by Director Y in connection with updating RDF group information included in data storage system $X_n$ without having a link up between data storage systems Xn-1 306 and Xn 308. A physical connection exists between data storage system Xn and Xn-1. However, processing steps have not been taken in connection with initializing this physical connection as being actively used for communications between the two directors.

As described previously in connection with step 398 processing, a task is initiated on Director Y to begin transferring group information in connection with the RDF group modification command to the remote data storage system Xn. The processing steps take into consideration the fact that a group may be an empty group. Group information may be transferred between data storage systems Xn and Xn-1 using parameters to include the necessary group information as communicated in the multihop system call. The general technique described in following paragraphs is to initially begin the link discovery process to search for an unused link between the data storage system Xn and Xn-1 and then to terminate this initialization or starting process prior to completion of the initialization steps after it is discovered that the data storage system Xn received the updated group information and returned a status. Subsequently, Director Y indicates this particular link as not being initialized again. The following description assumes that there is at least one link that is not initialized and available for use.

A number of usable links may be reserved and made available for use in connection with dynamically modifying and/or creating RDF groups. For example, in one embodiment 64 usable links may exist and the last two links may be reserved for use by this technique described herein. The number of usable links available for other purposes such as by a user is 62. Other embodiments may have different numbers of available and reserved links and may utilize other techniques in connection with this processing.

Prior to Director Y executing the special task, a new target is created in data storage system Xn-1 using a designated link index associated with one of the reserved available links between data storage systems X and Xn-1. As part of the processing to create a new target, the Director Y may initialize system data structures necessary to define the link between director Y and a target director in data storage system Xn. Director Y may utilize, for example, the tables 142 and 144 in a GigE embodiment, or a naming service in a fiber switch embodiment in obtaining the target director address to be included in the necessary data structures. A link index in this particular example is associated with each of the particular communication connections available for use between the data storage systems. A physical connection may exist, however, it may already be in use in connection with other communications. A link index may be associated with a link considered "available" if the link is currently not in use or allocated, but is up and running. Director Y attempts to connect to a director in the data storage system Xn. A device identifier associated with the director in data storage system Xn may be obtained using, for example, routine calls included in an API. Director Y tries to connect to the remote data storage system and may wait for a period of time until success occurs. Director Y may otherwise abort after failure or after a time-out period.

It should be noted that in a fiber switch embodiment, director Y may transmit the necessary parameter information to set up the RDF group to any one of the directors of Xn specified by the bitmask (other_supported_dir). In the GigE embodiment, communications from Director Y may be directed to the Xn director number indicated above in gige_other_side_anchor. In a fiber switch embodiment, it should be noted that the bitmask in the received system call data may be 0. In this instance, the director may use a non-zero mask from a previous corresponding entry. In the event that this previous mask is also zero, the director Y may determine, using the WWN for example, which directors are on the remote data storage system Xn and select one for use as the "anchor" in communications. If no directors are determined, then system call fails since the Director Y is unable to communicate with the remote data storage system.

Once a connection is established, Director Y prepares the extended parameter information of the new group and an indication if this is a creation or deletion operation. Director Y sends this information to a responder included in the data storage system Xn. The data storage system Xn receives this command, recognizes it as the first command on this link, and recognizes this command as an attempt to create a new group. The data storage system Xn receiving the new group command knows that Director Y of data storage system Xn−1 is executing the special task for the dynamic group modification and accordingly stops the link discovery process portion of initialization on the data storage system Xn. The responder may set appropriate hardware and/or software settings to indicate the link as uninitialized. The responder may also create a GST queue record request to execute the received dynamic group change which is executed by a director at some point later. The director makes the link uninitialized in data storage system Xn. The director then returns a status response to Director Y in data storage system Xn−1.

Director Y receives the response, indicates the link as uninitialized in data storage system Xn−1, and invalidates the target. The target may be invalidated, for example, by invalidating the appropriate data structures previously initialized. This may include, for example, setting appropriate bits indicating "unused" system data structures and/or returning the data structures to a pool of available data structures. Data storage system Xn−1 resumes with processing steps performed after special task processing.

A flowchart of FIG. 15 will now be described summarizing processing steps just described in connection with the special task execution of Director Y and steps executed when Director A receives the dynamic group command creation data.

Figure 15:
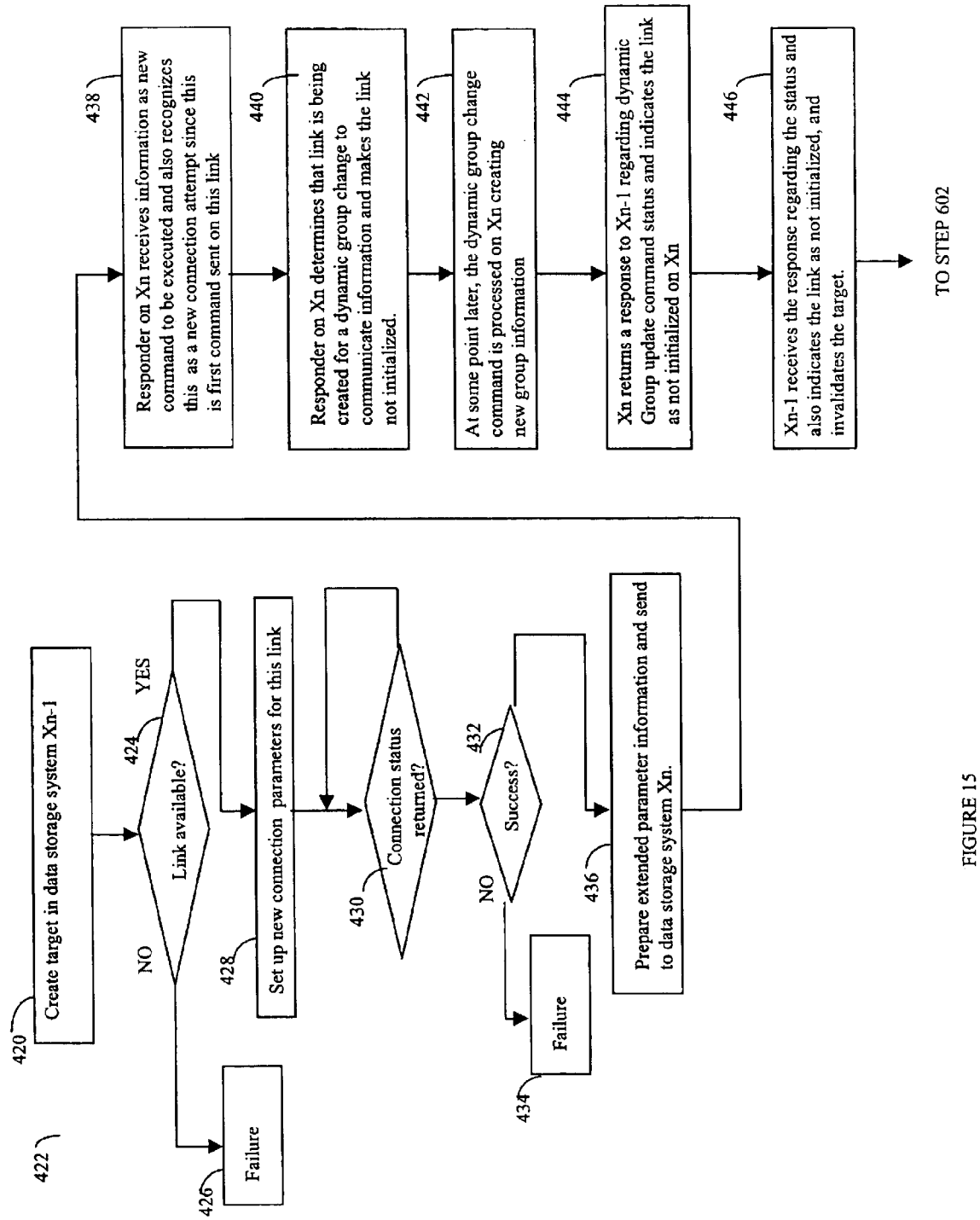

Referring now to FIG. 15, shown is a flowchart of processing steps performed by both the data storage systems Xn and Xn−1 without having a link between the data storage system initialized when communicating the dynamic group command information to Xn. At step 420, prior to execution of the special task on data storage system Xn−1, Director Y creates a new target. At step 424, a determination is made as to whether a link is available. If there is none available, control proceeds to step 426 where a failure is returned in connection with this operation. Otherwise, control proceeds to step 428 where the new connection parameters are set up for this particular link and an attempt is made to connect to data storage system Xn.

At step 430, Director Y waits until a connection status has been returned for the particular link of interest. If success is not indicated, control proceeds to step 434 where there is a failure status returned. Otherwise, control proceeds from step 432 to step 436 where extended parameter information is prepared and sent to the data storage system Xn It should be noted that steps 420 through 436 inclusively as included in flowchart 422 are performed in this example by Director Y of data storage system Xn−1. Control proceeds to step 438 where execution of steps may be performed by data storage system Xn upon receiving the information from Director Y. A director of Xn, such as Director A, also recognizes that this is a new connection attempt since this is a first command sent on this particular link. Control proceeds to step 440 where the responder director on Xn determines that a link is being created for a dynamic group change command. The responder, Director A of Xn determines that this link is being created for a dynamic group change operation and the link is being used to communicate information in connection with this operation. Director A makes the link not initialized. Director A may also create a GST queue record for the dynamic group change command which is then processed at some point later in step 442 resulting in the new group being created in Xn with the new group information. It should also be noted that failure may otherwise be indicated by this operation failing.

At step 444, Director A of data storage system Xn returns a status response to Director Y data storage system Xn−1 regarding the outcome of the dynamic group update command. Director Y also indicates this link as not initialized on data storage system Xn. At step 446, Director Y receives the response regarding the status and also indicates the link as not being initialized and invalidates the target.

What will now be described are more detailed processing steps of what occurs within data storage system Xn when the responder receives the command request and parameters from Director Y during execution of the special task In connection with processing on data storage system Xn, the responder receives the new group information and the extended parameters as transmitted from the Director Y. In following paragraphs, the responder within data storage system Xn may be referred to as Director A.

Director A on data storage system Xn verifies that the group can be created by testing for conditions similar to those, for example, described previously in connection with processing by Director Y of data storage system Xn−1. If all of the conditions are successfully verified, Director A locks the dynamic group lock in global memory. Similarly, as described elsewhere herein, in connection with data storage system Xn−1, Director A updates its local copy of the DRGT in nonvolatile memory using the copy of DRGT from global memory. Director A may take steps to synchronize processing steps ongoing between data storage systems Xn and Xn−1. For example, in one embodiment, Director A may set a group bit to prevent the link discovery process from starting within data storage system Xn before data storage system Xn−1 has the appropriate group information set up. In this embodiment, a bit mask corresponding to each group may also be stored in global memory. The bit mask may indicate settings for each particular group. In this instance, the group bit enabling link discovery may be disabled until when all processing steps are complete for defining a new group, for example, all directors needed for defining the new group as specified in the system command have updated local DRGT entries, and the like as described herein.

Director A then disconnects from the special task executing on Director Y. This disconnect is performed in this embodiment rather than return a status value to Director Y. Director A then copies the extended parameters sent by the special task executing on Director Y to a temporary global memory structure. Director A creates a GST queue record request for other RAs needed to create this new group regarding the dynamic group change information communicated in the extended parameters and then goes into a wait state. The GST queue record requests that all designated RAs needed to create this new group information perform a verification step and then, upon successful verification, update their local copy of the DRGT to include the new group information. The verification step in this embodiment may include determining if the director that issued the GST record request is the same director that locked the dynamic group lock in global memory.

Each of the RAs returns a status response to Director A. If Director A receives a successful status response from the other RAs needed to create the group, Director A then: updates the DRGT in global memory to include the new group information, turns off the group bit to enable the link discovery process, issues a GST queue record request to all other directors, including RAs, HAs and DAs, to update their local DRGT copies and create and update any required group masks in accordance with this dynamic group change.

Alternatively, if any of the RAs fail individually, they return a status failure to the Director A. Director A proceeds with processing steps to "undo" the creation of the group, for example, by not updating the DRGT copy in global memory and issuing a request for all RAs involved to overwrite their local DRGT copy with the unmodified DRGT from global memory.

If any one of the directors failed, the creation of the dynamic group information is undone similar to as described herein in which GSTQ records are issued to all of the other RA's who undo the information stored in their local DRGT. In other words, each of the RA's has their local DRGT restored to the copy in global memory that was untouched not reflecting the current RDF group change. Director A included in data storage system Xn responds to Director Y of data storage system Xn−1 with a success or failure indication with some additional information in the case of a failure. This may vary in accordance with each type of embodiment as to exactly what information is passed and actions taken.

Figure 16:
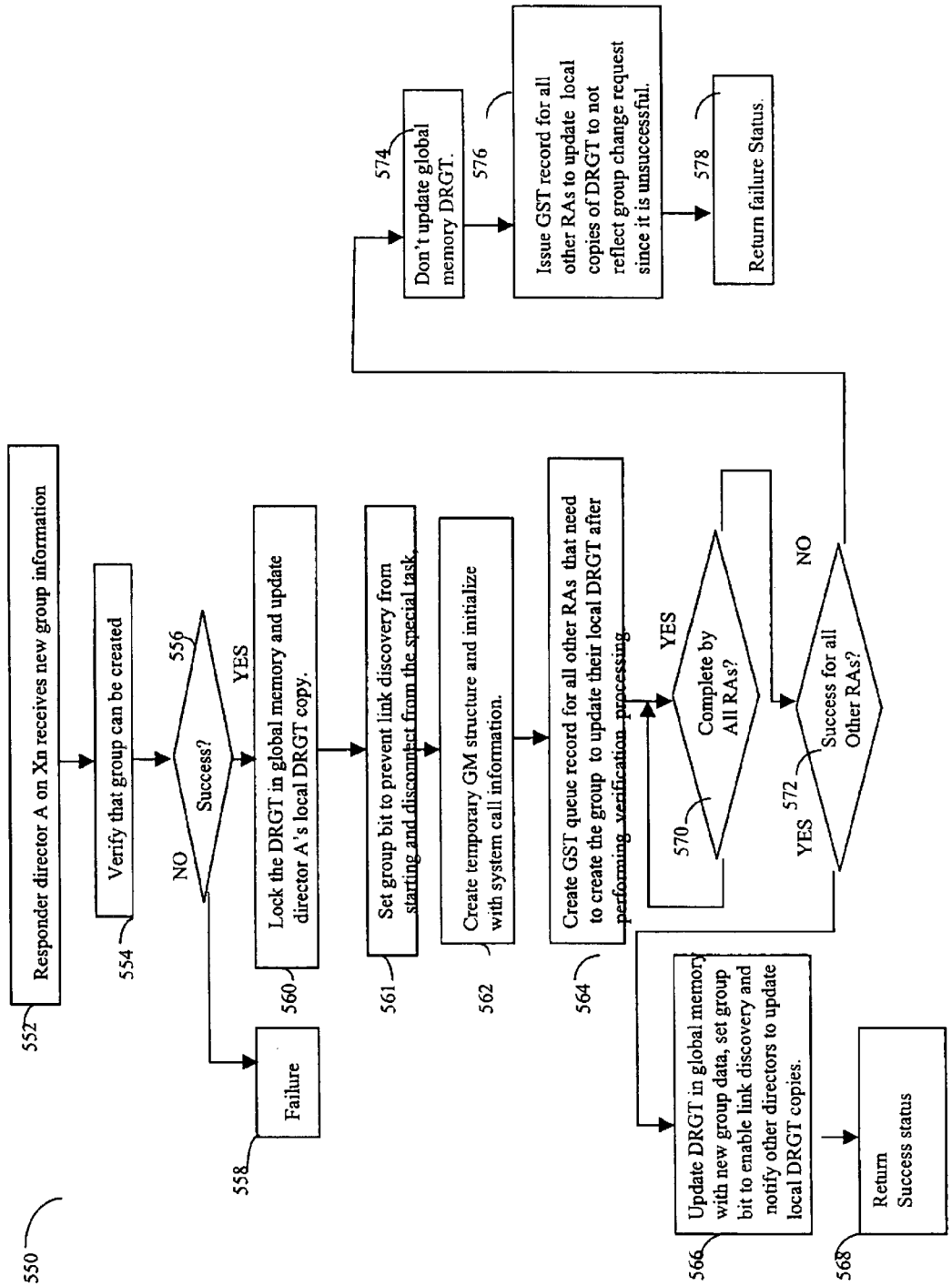

Referring now to FIG. 16, shown is the flowchart 550 of steps of one embodiment that includes more detailed processing steps that may be performed by Director A previously described in connection with steps 438, 440, 442 and 444 upon receiving the new group information. At step 552, the responder Director A in the data storage system Xn receives the new group information. At step 554, Director A verifies that the group can be created. At step 556, a determination is made as to whether this verification process was successful. If it was not, control proceeds to step 558 where failure is returned. Otherwise, control proceeds from step 556 to step 560 where the DRGT in the global memory is locked and Director A's local DRGT copy is updated using information from the global memory copy. Additionally, Director A's local DRGT copy is updated to include the new group information. At step 561, the appropriate group bit is set to prevent the link discovery process from starting and Director A disconnects from the special task executing on Director Y. At step 562, a temporary global memory structure is created and initialized with the system call information. At step 564, a GST queue record is created and sent to other RAs needed to create the new group regarding the new dynamic group information passed to Director A. The RAs perform initial verification checking and, if successful, update their local DRGT copy and return a status to Director A. Director A waits to receive a completion status or a time-out from all of the other RA's at step 570. Upon receiving a completion status or time-out from all of the other RA's, control proceeds to step 572 where a determination is made as to whether a successful status has been received for all of the RAs. If so, control proceeds from step 572 to step 566 where the DRGT in global memory is updated with the new group information, appropriate group bits are modified to enable link discovery process, and any other directors, such as HAs, other RAs or DAs, are also requested to update local DRGT copies regarding this new or modified RDF group. As described elsewhere herein, these directors may update local DRGT using the global memory copy of the DRGT and the temporary global memory structure. Control proceeds to step 568 where a status of success is returned from Director A to Director Y As described herein, enabling the link discovery process may cause an automatic process within the data storage system to be executed at some later point in time to complete processing in connection with the particular RDF links allocated for the dynamic group making the RDF links and RDF groups available for use.

If at step 572, any one of the RAs do not return success, control proceeds to step 574 where the global memory DRGT is not updated, and, at step 576, commands are issued to undo the previous DRGT updates to the local copies of those RAs notified at step 564. This may be performed, for example, in this embodiment by instructing each of the local RAs to copy the DRGT of global memory. At step 578, a status of failure is returned to Director Y of data storage system Xn−1.

Subsequent to data storage system Xn−1 receiving a return status from data storage system Xn, processing by Director Y of data storage system Xn−1 resumes. Director Y performs a determination as to whether the status of the dynamic group creation was successful. In the event that the status indicates that all directors were successful such that all of the directors in both data storage systems Xn and Xn−1 have been updated, the DRGT in global memory of the data storage system Xn−1 is updated. Additionally, any necessary hardware and/or software bits and flags are modified appropriately to enable the link discovery process for the newly established or newly defined RDF link as being available. Additionally, when all directors which were asked to update their tables in connection with this operation have been successful, the remaining directors, including for example HAs, DAs and any remaining RAs, are requested utilizing a GST queue record to update local DRGT copies and create the required masks as may also be maintained locally in accordance with the new group information.

If any one of the directors has failed, the creation of the group is "undone", for example, by not updating the DRGT in global memory on Xn−1 and issuing to all of the RAs that have already updated their local DRGTs an override operation to update local DRGTs with a copy of the DRGT from global memory. The director Y of data storage system Xn−1 returns status information to Director X. Director X similarly returns status information as in connection with a multihop system call until the results are propagated back to the host computer system which issued the command.

Figure 17:
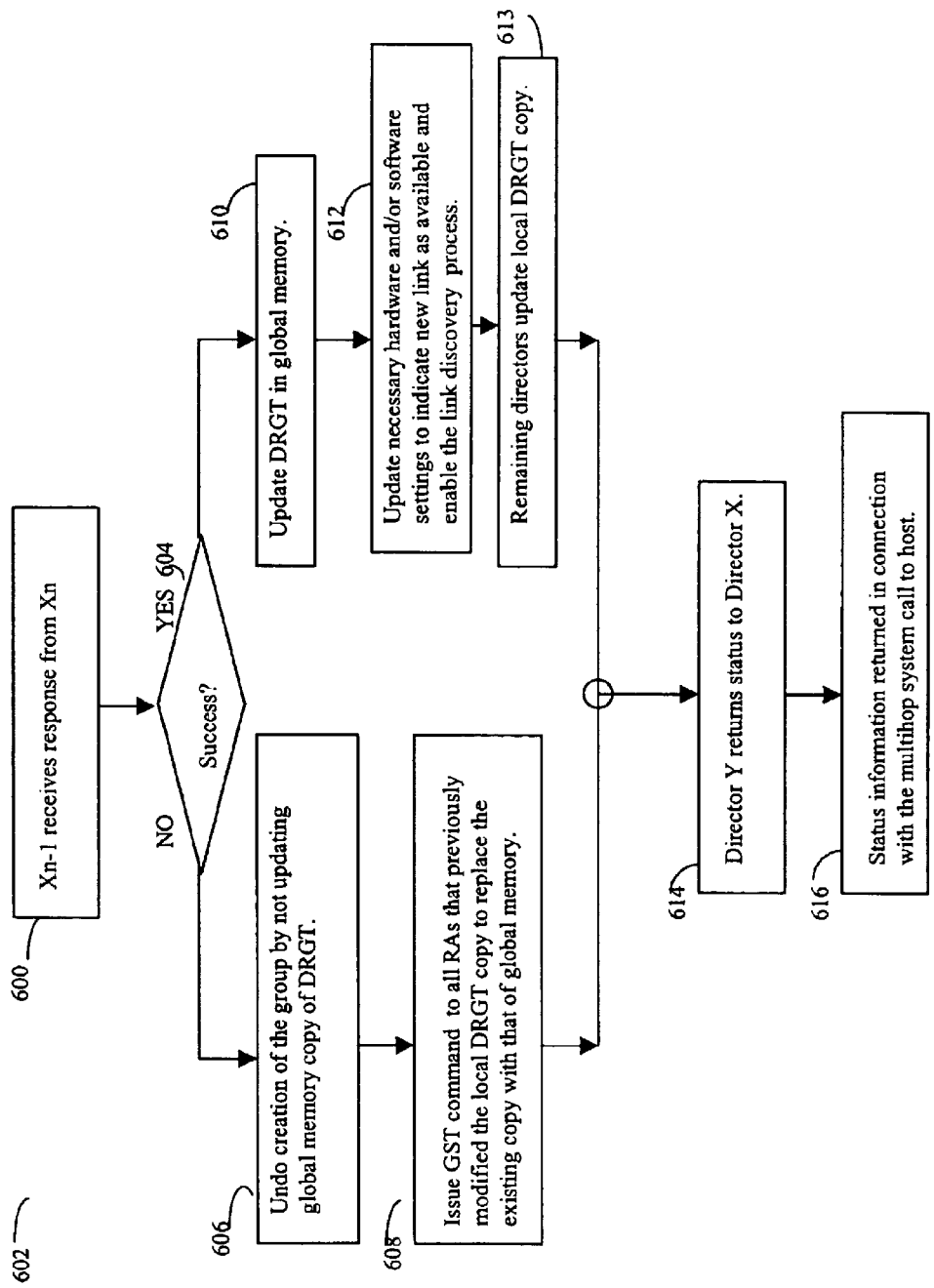

Referring now to FIG. 17, shown is a flowchart of processing steps summarizing the steps performed by Director Y when Director A of data storage system Xn sends return status information to Director. At step 600, data storage system Xn−1 receives a response from data storage system Xn. A determination is made on data storage system Xn as to whether the dynamic group operation was successful. If not, control proceeds to step 606, where the creation of the group is undone on data storage system Xn−1 by not updating the global memory copy of the DRGT. At step 608 a GST queue record is created requesting that all of the RAs that had previously modified local DRGT copies replace the local DRGT copies with the unmodified DRGT from global memory.

If at step 604 it is determined that the dynamic group creation was successful, control proceeds to step 610 where the DRGT in global memory is updated using the copy stored previously in the temporary structure created. Additionally, control proceeds to step 612 where any necessary hardware and/or software settings are modified to indicate the new link as available by enabling the link discovery process. Additionally, at step 613, any remaining directors, including, for example, HAs, DAs and remaining RAs, are requested via a GST queue record to update their local copies of the DRGT to reflect the new dynamic RDF group.

It should be noted that the foregoing description includes a dynamic group lock, for example as used in connection with step 388 and 560 processing, in each data storage system in global memory. Although not explicitly stated in any subsequent processing steps, the dynamic group lock is released within each data storage system when the processing associated with the dynamic RDF group system call is complete within each respective data storage system. For example, the lock may be released prior to returning a success or failure status to another director in another data storage system as indicated in various processing steps described above.

Timestamps may also be associated with each copy of the DRGT stored in local non-volatile memory of each director and the global memory copy as well. In the event that there is a power failure, for example, the DRGT having the latest timestamp may be used to synchronize other versions of the DRGT in global memory and between the other local directors.

A dynamic group may be initially created, and devices and links may be dynamically added to this group using a dynamic configuration file, for example, using the dynamic RDF techniques as described in U.S. patent application Ser. No. 09/997,810 filed on Nov. 30, 2001. In connection with the foregoing dynamic group command, various dynamic group operations may be performed. For example, a director servicing a group on one or both of data storage systems Xn and Xn−1 may be removed, and a director servicing a group on one or both of data storage systems Xn and Xn−1 may be added.

It should be noted that in the foregoing description, a single group may be serviced by more than one director in the same data storage system.

The foregoing provides a flexible and efficient technique for performing a dynamic RDF group command without requiring a link between the two data storage systems to be initialized and ready to transmit user data. The physical link exists between the two systems but is not allocated and established for communications between the two systems. Partial initialization processing steps are performed to initially push information, such as setup and command data, from the first to the second system and return an acknowledgement to the first system. The link is then indicated as uninitialized until both first and second data storage system perform the remaining setup and initialization processing prior to enabling the link between the two systems as being recognized and used in communications between the two systems for transmitting user data.

In the foregoing description, it should be noted that a first link used to transmit the dynamic group configuration information may be different from a second link used in transmitting user data. For example, as described herein, links 62 and 63 may be used for passing the group information with the remaining links 0 through 61 inclusively available for transmitting user data. Other embodiments may use other link determinations in transmitting user and/or group configuration data.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for dynamically modifying a communication path between a first group of devices in a first data storage system and a second group of devices in a second data storage system comprising:

issuing a command request to said first data storage system to dynamically modify said communication path;

pushing setup data from said first data storage system to said second data storage system using a first communication link that is not used to transmit user data;

obtaining a second communication link, different from said first communication link, between said first group of devices and said second group of devices;

preparing a first part of a connection to said first group of devices;

after successfully preparing said first part, preparing a second part of said connection to said second group of devices; and after successfully preparing said first and second parts of said connection, indicating that said communication path is ready to transmit user data via said second communication link, wherein, in response to a user writing user data to the first group of devices, the user data is automatically copied from the first group of devices to the second group of devices.

2. The method of claim 1, further comprising:

prior to preparing said first part of said connection, a first processor in said first data storage system verifying with a first service processor servicing said first group of devices whether said communication path may be modified in accordance with said command request; and prior to preparing said second portion of said connection, a second processor in said second data storage system verifying with a second service processor servicing said second group of devices whether said communication path may be modified in accordance with said command request.

3. The method of claim 1, wherein said preparing said first part of said communication connection includes modifying a table containing dynamic configuration information for said first group of devices.

4. The method of claim 3, wherein said preparing said second part of said communication connection includes modifying a table containing dynamic configuration information for said second group of devices.

5. The method of claim 1, further comprising:
a first processor in said first data storage system sending a command request to at least one service processor of said first data storage system identified in said command request; and
a second processor in said second data storage system sending a command request to at least one service processor of said second data storage system identified in said command request.

6. The method of claim 1, comprising:
a host computer system issuing said command request.

7. The method of claim 6, wherein said host computer system issues a remote procedure call to said first data storage system.

8. The method of claim 7, wherein said host computer system issues said remote procedure call to said first data storage system indirectly through at least one other intermediate data storage system connected to said first data storage system.

9. The method of claim 8, wherein said first data storage system sends a return status to said host computer system.

10. The method of claim 1, wherein said communication link is partially initialized.

11. The method of claim 1, wherein said setup data is pushed over a communication link using a switch.

12. The method of claim 11, wherein said switch includes at least one of: a GigE connection and a fiber switch connection.

13. The method of claim 12, wherein said connection is a fiber switch connection, and the method further comprising:
obtaining, by said first data storage system, an address of said second data storage system using a naming service with data provided in said command request.

14. The method of claim 12, wherein said connection is a GigE connection, and the method further comprising:
obtaining, by said first data storage system, an address of said second data storage system using using at least one configuration table stored in said first data storage system.

15. The method of claim 1, wherein said command request is for one of: dynamically creating a new group, dynamically removing a group, dynamically adding a director to service one of said first and second groups of devices, and dynamically removing a director servicing one of said first and second groups of devices.

16. The method of claim 1, wherein at least on of said first and second groups of devices are empty.

17. The method of claim 1, further comprising:
failing to execute said command request when said command request is to remove a service processor from servicing one of said first and second groups of devices and said service processor is the only service processor servicing said one of said first and second groups and said one of said first and second groups is not empty.

18. The method of claim 1, further comprising:
indicating that a portion of a destination volume in said second group of devices contains invalid data; and
copying data from a source volume in said first group of devices to said destination volume after indicating that said communication path is ready to transmit data.

19. The method of claim 1, further comprising:
indicating that a portion of a destination volume in said first group of devices contains invalid data; and
copying data from a source volume in said second group of devices to said destination volume after indicating that said communication path is ready to transmit data.

20. The method of claim 2, further comprising:
said second processor waiting for all service processors in said second data storage system which are specified in said command request for modifying said communication path to return a status;
after receiving a successful status from all said services processors in said second data storage system, updating a global copy of dynamic configuration data in said second data storage system with a modification indicated in said command request; and
updating copies of dynamic configuration data maintained locally by other processors in said second data storage system.

21. The method of claim 20, further comprising:
receiving, by said first processor, a return status from said second processor as to whether said second data storage system has successfully completed preparing said second part of said connection;
in response to receiving a successful return status from said second processor, said first processor performing processing comprising:
updating a global copy of dynamic configuration data in said first data storage system with a modification indicated in said command request; and
updating copies of dynamic configuration data maintained locally by other processors in said first data storage system.

22. A computer program product for dynamically modifying a communication path between a first group of devices in a first data storage system and a second group of devices in a second data storage system comprising:
machine executable instructions for issuing a command request to said first data storage system to dynamically modify said communication path;
machine executable instructions for pushing setup data from said first data storage system to said second data storage system using a first communication link that is not used to transmit user data;
machine executable instructions for obtaining a second communication link, different from said first communication link, between said first group of devices and said second group of devices;
machine executable instructions for preparing a first part of a connection to said first group of devices;
machine executable instructions for, after successfully preparing said first part, preparing a second part of said connection to said second group of devices; and machine executable instructions for, after successfully preparing said first and second parts of said connection indicating that said communication path is ready to transmit user data via said second communication link, wherein, in response to a user writing user data to the first group of devices, the user data is automatically copied from the first group of devices to the second group of devices.

23. The computer program product of claim 22, further comprising:
machine executable instructions for verifying, by a first processor in said first data storage system prior to preparing said first part of said connection, with a first service processor servicing said first group of devices whether said communication path may be modified in accordance with said command request; and
machine executable instructions for verifying, by a second processor in said second data storage system prior to preparing said second portion of said connection, with a second service processor servicing said second group of devices whether said communication path may be modified in accordance with said command request.

24. The computer program product of claim 22, wherein said machine executable code for preparing said first part of said communication connection includes machine executable code for modifying a table containing dynamic configuration information for said first group of devices.

25. The computer program product of claim 24, wherein said machine executable instructions for preparing said second part of said communication connection includes machine executable instructions for modifying a table containing dynamic configuration information for said second group of devices.

26. The computer program product of claim 22, further comprising:
machine executable code for sending, by a first processor in said first data storage system, a command request to at least one service processor of said first data storage system identified in said command request; and
machine executable instructions for sending, by a second processor in said second data storage system, a command request to at least one service processor of said second data storage system identified in said command request.

27. The computer program product of claim 22, comprising:
machine executable code for issuing said command request by a host computer.

28. The computer program product of claim 27, further comprising machine executable code for issuing, by said host computer system, a remote procedure call to said first data storage system.

29. The computer program product of claim 28, further comprising machine executable code for issuing, by said host computer system, said remote procedure call to said first data storage system indirectly through at least one other intermediate data storage system connected to said first data storage system.

30. The computer program product of claim 29, further comprising machine executable code for returning, by said first data storage system, a return status to said host computer system.

31. The computer program product of claim 22, wherein said communication link is partially initialized.

32. The computer program product of claim 22, wherein said setup data is pushed over a communication link using a switch.

33. The computer program product of claim 32, wherein said switch includes at least one of: a GigE connection and a fiber switch connection.

34. The computer program product of claim 33, wherein said connection is a fiber switch connection, and the computer program product further comprising:
machine executable code for obtaining, by said first data storage system, an address of said second data storage system using a naming service with data provided in said command request.

35. The computer program product of claim 33, wherein said connection is a GigE connection, and the computer program product further comprising:
machine executable code for obtaining, by said first data storage system, an address of said second data storage system using using at least one configuration table stored in said first data storage system.

36. The computer program product of claim 22, wherein said command request is for one of: dynamically creating a new group, dynamically removing a group, dynamically adding a director to service one of said first and second groups of devices, and dynamically removing a director servicing one of said first and second groups of devices.

37. The computer program product of claim 22, wherein at least on of said first and second groups of devices are empty.

38. The computer program product of claim 22, further comprising:
machine executable code for failing to execute said command request when said command request is to remove a service processor from servicing one of said first and second groups of devices and said service processor is the only service processor servicing said one of said first and second groups and said one of said first and second groups is not empty.

39. The computer program product of claim 22, further comprising:
machine executable code for indicating that a portion of a destination volume in said second group of devices contains invalid data; and
machine executable code for copying data from a source volume in said first group of devices to said destination volume after indicating that said communication path is ready to transmit data.

40. The computer program product of claim 22, further comprising:
machine executable code for indicating that a portion of a destination volume in said first group of devices contains invalid data; and
machine executable code for copying data from a source volume in said second group of devices to said destination volume after indicating that said communication path is ready to transmit data.

41. The computer program product of claim 23, further comprising:
machine executable code for, by said second processor, waiting for all service processors in said second data storage system which are specified in said command request for modifying said communication path to return a status;
machine executable code for, after receiving a successful status from all said services processors in said second data storage system, updating a global copy of dynamic configuration data in said second data storage system with a modification indicated in said command request; and machine executable code for updating copies of dynamic configuration data maintained locally by other processors in said second data storage system.

42. The computer program product of claim 41, further comprising:
   machine executable code for receiving, by said first processor, a return status from said second processor as to whether said second data storage system has successfully completed preparing said second part of said connection;
   machine executable code that, in response to receiving a successful return status from said second processor, causes said first processor to perform processing comprising:
      updating a global copy of dynamic configuration data in said first data storage system with a modification indicated in said command request; and
      updating copies of dynamic configuration data maintained locally by other processors in said first data storage system.

43. The method of claim 1, wherein copying of user data is performed using first and second adapters, said first adapter servicing said first group of devices and said second adapter servicing said second group of devices.

44. The computer program product of claim 22, wherein copying of user data is performed using first and second adapters, said first adapter servicing said first group of devices and said second adapter servicing said second group of devices.

45. The method of claim 1, wherein, in response to a request to create a dynamic group, a communication link is added for the dynamic group including said first and said second groups of devices.

46. The method of claim 45, wherein, in response to a request to remove said dynamic group, said communication link is removed.

47. The computer program product of claim 22, wherein, in response to a request to create a dynamic group, a communication link is added for the dynamic group including said first and said second groups of devices.

48. The computer program product of claim 47, wherein, in response to a request to remove said dynamic group, said communication link is removed.

49. A method performed by a first data storage system including a first group of devices for providing remote data copying to a remote data storage system including a second group of devices, and wherein, in response to a user writing user data to the first group of devices, the user data is automatically copied from the first group of devices to the second group of devices, the method comprising:
   receiving, at said first data storage system, a request from a host system to perform a dynamic group operation for said first group of devices and said second group of devices;
   transmitting, by said first data storage system using a first communication link to said remote data storage system that is not used to transmit user data, setup data for said dynamic group operation;
   obtaining a second communication link between said first group of devices and said second group of devices, said second communication link being used to transmit user data;
   receiving, by said first data storage system using said first communication link, a response from said remote data storage system in connection with said dynamic group operation; and
   transmitting, by said first data storage system, a status to said host system for said dynamic group operation.

50. The method of claim 49, wherein said request is received by a first director in said first data storage system from said host system to perform said dynamic group operation.

51. The method of claim 50, wherein said first data storage system includes a second director, said request being transmitted from said first director to said second director, and from said second director to said remote data storage system.

52. The method of claim 51, further comprising:
   performing, by said first data storage system, first processing steps in connection with said dynamic group operation in said first data storage system for said first group of devices;
   determining, by said first data storage system in response to receiving said response from said remote data storage system, whether performing second processing steps in connection with said dynamic group operation in said remote data storage system is successful; and
   in response to determining success of said dynamic group operation in connection with said first processing steps and said second processing steps, indicating that said communication link is ready to transmit user data.

53. The method of claim 52, further comprising:
   updating dynamic group information on said first data storage system in accordance with said request.

54. A computer program product including code readable by a first data storage system including a first group of devices for providing remote data copying to a remote data storage system including a second group of devices, and wherein, in response to a user writing user data to the first group of devices, the user data is automatically copied from the first group of devices to the second group of devices, the computer program product including code that:
   receives, at said first data storage system, a request from a host system to perform a dynamic group operation for said first group of devices and said second group of devices;
   transmits, by said first data storage system using a first communication link to said remote data storage system that is not used to transmit user data, setup data for said dynamic group operation;
   obtains a second communication link, different from said first communication link, between said first group of devices and said second group of devices, said second communication link being used to transmit user data;
   receives, by said first data storage system using said first communication link, a response from said remote data storage system in connection with said dynamic group operation; and
   transmits, by said first data storage system, a status to said host system for said dynamic group operation.

55. The computer program product of claim 54, wherein said request is received by a first director in said first data storage system from said host system to perform said dynamic group operation.

56. The computer program product of claim 55, wherein said first data storage system includes a second director, said request being transmitted from said first director to said second director, and from said second director to said remote data storage system.

57. The computer program product of claim 56, further comprising code that:

performs, by said first data storage system, first processing steps in connection with said dynamic group operation in said first data storage system for said first group of devices;

determines, by said first data storage system in response to receiving said response from said remote data storage system, whether performing second processing steps in connection with said dynamic group operation in said remote data storage system is successful; and in response to determining success of said dynamic group operation in connection with said first processing steps and said second processing steps, indicates that said communication link is ready to transmit user data.

58. The computer program product of claim 57, further comprising code that:

updates dynamic group information on said first data storage system in accordance with said request.

* * * * *